(12) United States Patent
Gibbon et al.

(10) Patent No.: US 9,626,639 B2
(45) Date of Patent: Apr. 18, 2017

(54) IMAGE PROCESSING AND ITEM TRANSPORT

(71) Applicant: Shyp, Inc., San Francisco, CA (US)

(72) Inventors: Kevin Gibbon, San Francisco, CA (US); Dan Rummel, San Francisco, CA (US)

(73) Assignee: Shyp, Inc., San Francisco, CA (US)

( * ) Notice: Subject to any disclaimer, the term of this patent is extended or adjusted under 35 U.S.C. 154(b) by 0 days.

(21) Appl. No.: 14/826,098

(22) Filed: Aug. 13, 2015

(65) Prior Publication Data

US 2015/0348282 A1    Dec. 3, 2015

Related U.S. Application Data

(60) Provisional application No. 62/056,456, filed on Sep. 26, 2014.

(51) Int. Cl.
  *G06Q 10/06* (2012.01)
  *G06Q 10/08* (2012.01)
  (Continued)

(52) U.S. Cl.
  CPC ..... *G06Q 10/06315* (2013.01); *G06Q 10/083* (2013.01); *G06Q 50/30* (2013.01); *G06T 7/62* (2017.01)

(58) Field of Classification Search
  None
  See application file for complete search history.

(56) References Cited

U.S. PATENT DOCUMENTS 5,122,959 A   6/1992 Nathanson et al.
5,922,040 A   7/1999 Prabhakaran
(Continued)

FOREIGN PATENT DOCUMENTS

EP    2333705 A1    6/2011
EP    2765551 A1    8/2014
WO    2013/058855 A1   4/2013

OTHER PUBLICATIONS

De Decker, Kris, "Cargo cyclists replace truck drivers on European city streets", (Sep. 24, 2012), 14 pages. Retrieved Aug. 25, 2015 from http://www.lowtechmagazine.com/2012/09/jobs-of-the-future-cargo-cyclist.html.

(Continued)

*Primary Examiner* — Michelle Hausmann
*Assistant Examiner* — Michelle Entezari
(74) *Attorney, Agent, or Firm* — Kilpatrick Townsend & Stockton LLP

(57) ABSTRACT

Embodiments relate generally to new and useful systems and methods for processing digital images of items to facilitate item transport and/or handling. In some embodiments, a method is provided for operating an image processing and item transport system having a computing system that includes a digital image processing component. In some embodiments, the method can involve the digital image processing component acquiring a digital image and processing the digital image to obtain a digital representation of an item represented in the digital image, to estimate a dimensional size and/or weight of the item represented in the digital image, and to convert the digital image to a format suitable for outputting. In some embodiments, the method can include processing the estimated dimensional size and/or weight to identify personnel and/or equipment capable of transporting the item represented in the digital image, and outputting a transport instruction identifying the personnel and/or equipment capable of transporting the item represented in the digital image.

5 Claims, 16 Drawing Sheets

(51) Int. Cl.
*G06Q 50/30* (2012.01)
*G06T 7/62* (2017.01)

(56) References Cited

U.S. PATENT DOCUMENTS

| | | | | |
|---|---|---|---|---|
| 6,005,959 | A * | 12/1999 | Mohan | G01B 11/024 348/89 |
| 6,889,194 | B1 | 5/2005 | Kadaba | |
| 6,963,861 | B1 | 11/2005 | Boucher et al. | |
| 7,194,331 | B2 | 3/2007 | Perez et al. | |
| 7,385,529 | B2 * | 6/2008 | Hersh | G06Q 10/06311 235/384 |
| 7,627,422 | B2 * | 12/2009 | Adamczyk | G01C 21/00 701/516 |
| 7,828,202 | B2 * | 11/2010 | Bregman | G06Q 10/087 235/376 |
| 7,840,319 | B2 | 11/2010 | Zhong | |
| 7,844,481 | B2 | 11/2010 | Hilbush et al. | |
| 7,883,013 | B2 | 2/2011 | Skaaksrud et al. | |
| 7,991,656 | B1 * | 8/2011 | Sacks | G06F 3/0346 235/462.45 |
| 8,126,903 | B2 * | 2/2012 | Lehmann | G06Q 10/06 707/736 |
| 8,521,656 | B2 * | 8/2013 | Zimberoff | G06Q 10/083 705/330 |
| 8,560,461 | B1 * | 10/2013 | Tian | G06Q 10/08 705/332 |
| 8,787,707 | B1 * | 7/2014 | Steves | G06Q 30/02 382/181 |
| 8,879,785 | B1 * | 11/2014 | Amacker | G06K 9/00624 382/101 |
| 9,042,922 | B2 * | 5/2015 | Papa, III | H04W 4/14 455/3.06 |
| 9,286,591 | B2 * | 3/2016 | Lehner | G06Q 10/0837 |
| 2007/0038506 | A1 * | 2/2007 | Noble | G06Q 10/08 705/13 |
| 2010/0222908 | A1 * | 9/2010 | Gombert | G06F 17/50 700/98 |
| 2011/0301985 | A1 | 12/2011 | Camp et al. | |
| 2012/0271592 | A1 * | 10/2012 | Harres | G01G 19/002 702/173 |
| 2013/0024232 | A1 | 1/2013 | Powell | |
| 2013/0132140 | A1 | 5/2013 | Amin et al. | |
| 2013/0132887 | A1 | 5/2013 | Amin et al. | |
| 2013/0144763 | A1 * | 6/2013 | Skyberg | G06Q 50/28 705/27.1 |
| 2013/0148848 | A1 * | 6/2013 | Lee | G06K 9/00771 382/103 |
| 2013/0182905 | A1 * | 7/2013 | Myers | H04N 7/18 382/103 |
| 2013/0293539 | A1 * | 11/2013 | Hunt | G06T 17/20 345/420 |
| 2013/0307964 | A1 * | 11/2013 | Bremer | G06K 9/22 348/135 |
| 2014/0104416 | A1 * | 4/2014 | Giordano | G01B 11/02 348/135 |
| 2014/0129302 | A1 | 5/2014 | Amin et al. | |
| 2014/0351265 | A1 * | 11/2014 | Beaurepaire | G06Q 10/08 707/748 |
| 2014/0376769 | A1 * | 12/2014 | Bulan | G06K 9/00771 382/103 |
| 2015/0012396 | A1 * | 1/2015 | Puerini | G06Q 10/0875 705/28 |
| 2015/0206339 | A1 * | 7/2015 | Chun | G06T 15/205 345/419 |

OTHER PUBLICATIONS

Anonymous, "Cycle freight in London: A scoping study" (May 2009), 93 pages.
Zäpfel G., Wasner M., "Architectures of Transportation Networks and their Effects on Economic Efficiency", in: Dyckhoff, H., Lackes, R., Reese, J. (Eds.), Supply Chain Management and Reverse Logistics, (Sep. 29, 2003), pp. 201-219.
International Search Report dated Dec. 11, 2015 for International Application No. PCT/US2015/050216, filed Sep. 15, 2015. 11 pages.

* cited by examiner

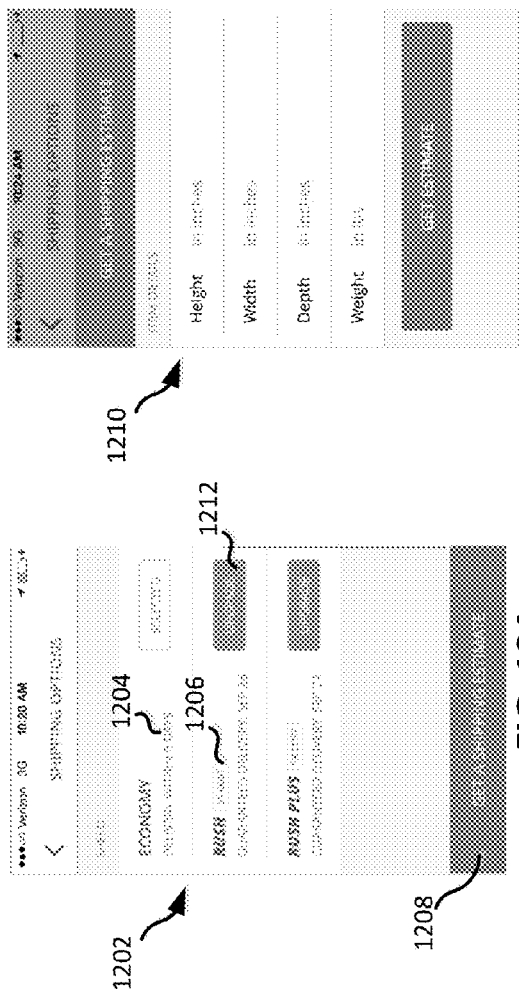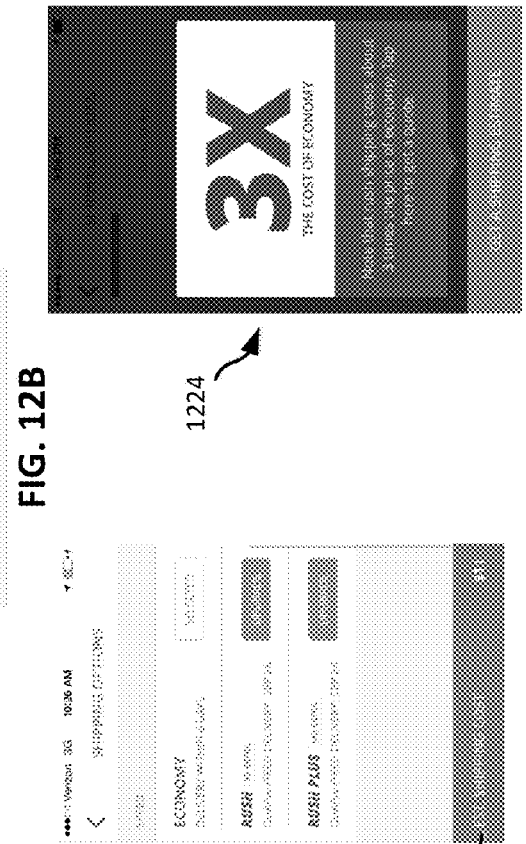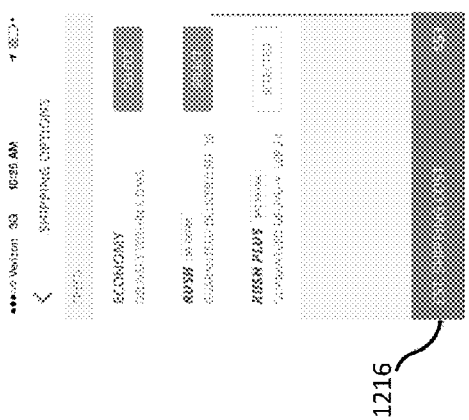
FIG. 12A
FIG. 12B
FIG. 12C
FIG. 12D
FIG. 12E

IMAGE PROCESSING AND ITEM TRANSPORT

CROSS-REFERENCES TO RELATED APPLICATIONS

This application claims the benefit of priority to and is a U.S. Non-Provisional Application of U.S. Provisional Application No. 62/056,456, filed on Sep. 26, 2014, which is incorporated by reference in its entirety.

TECHNICAL FIELD

Embodiments relate generally to image processing and item transport, and more specifically to new and useful systems and methods for processing digital images of items to facilitate item transport and/or handling.

BACKGROUND

As demand for item transport increases, so does demand for improvements to related services and products. Users expect greater levels of efficiency and convenience, at lower costs. Providers operate ever increasingly complex computer systems to try to meet these demands and expectations. Accordingly, there is a need to improve these complex computer systems to provide users with item transport services in the fastest, easiest, and most efficient manner possible.

SUMMARY

Embodiments relate generally to image processing and item transport, and more specifically to new and useful systems and methods for processing digital images of items to facilitate item transport and/or handling.

In some embodiments, a method is provided for operating an image processing and item transport system having a computing system that includes a digital image processing component. The method can comprise acquiring, by the digital image processing component, a digital image; processing, by the digital image processing component, the digital image to obtain a digital representation of an item represented in the digital image; processing, by the digital image processing component, the digital image to estimate a dimensional size and/or weight of the item represented in the digital image; processing, by the digital image processing component, the digital image to convert the digital image to a format suitable for outputting; processing the estimated dimensional size and/or weight to identify personnel and/or equipment capable of transporting the item represented in the digital image; and outputting a transport instruction identifying the personnel and/or equipment capable of transporting the item represented in the digital image.

BRIEF DESCRIPTION OF THE DRAWINGS

FIGS. 12A-E show graphical user interfaces according to some embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details, and that variations and other aspects not explicitly disclosed herein are contemplated within the scope of the various embodiments. Furthermore, well-known features may be omitted or simplified in order not to obscure the embodiment being described.

Figure 1:
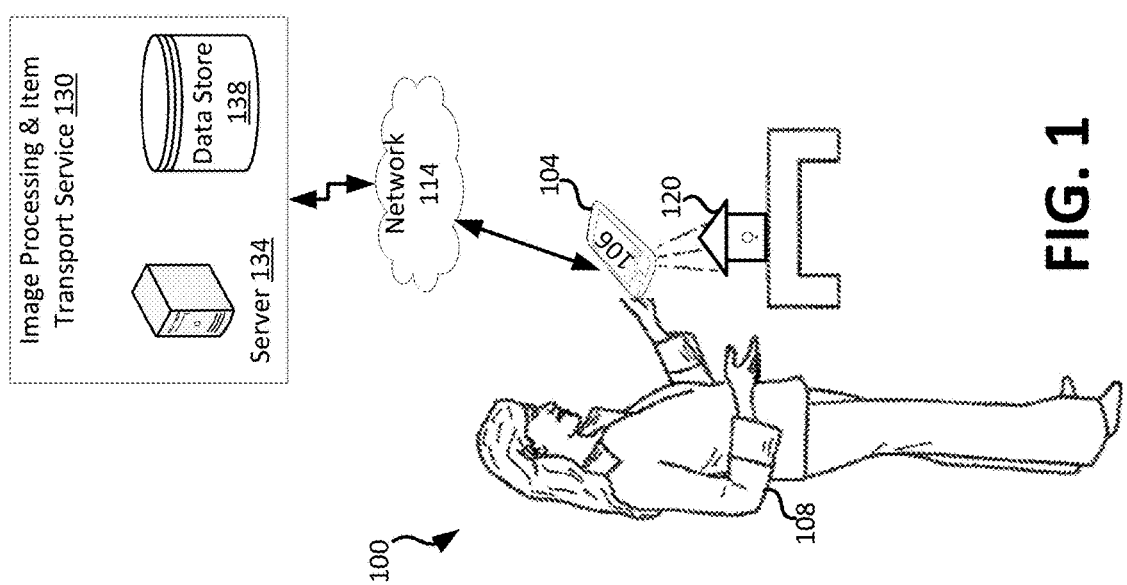
FIG. 1 shows a block diagram of an environment for implementing aspects of the present disclosure according to some embodiments.

FIG. 1 shows a block diagram an environment 100 according to some embodiments. As will be appreciated, although environment 100 is provided for purposes of explanation, different environments may be utilized, as appropriate, to implement various embodiments. Environment 100 can include image processing and item transport service 130 and on-demand pickup client application 106. On-demand pickup client application 106 can be executable on electronic communications device 104. Image processing and item transport service 130 and on-demand pickup client application 106 can be connected via network 114. User 108 can operate electronic communications device 104 to interact with on-demand pickup client application 106 and image processing and item transport service 130. For example, in some embodiments, such interaction can cause on-demand pickup client application 106 and image processing and item transport service 130 to obtain a current location of user 108 and a digital image of item 120; process the digital image to determine a characteristic of item 120; and identify and dispatch a suitable personnel and/or equipment (e.g., courier with vehicle having adequate capacity and/or capability)

based at least in part on the determined physical characteristic of item 120 and the current location of user 108.

In some embodiments, on-demand shipping client application 106 can be downloaded and installed on electronic communications device 104. For example, on-demand shipping client application 106 may be downloaded via network 114 from image processing and item transport service 130 and/or from any third-party service that makes applications available for download, such as Apple®, Google®, and/or Amazon®.

Network 114 can include any appropriate network, including wide area networks (WANs), such as the Internet, cellular networks, and/or other wireless data networks and/or telecom networks. Protocols and components for communicating via network 114 are well known and will not be discussed herein in detail. Communication over the network may be enabled by wired or wireless connections and combinations thereof.

Image processing and item transport service 130 can include server 134 and data store 138. It should be understood that FIG. 1 provides a simplistic embodiment for illustrative convenience, and that there may be several servers (e.g., application servers, web servers, database servers, etc.), data stores, layers, or other elements, processes, or components, that may be chained or otherwise configured, and that may interact to perform tasks described herein. As used herein the term "data store" refers to any device or combination of devices capable of storing, accessing, and/or retrieving data, which may include any combination and number of data servers, databases, data storage devices, and data storage media, in any standard, distributed, or clustered environment.

In some embodiments, server 134 can an application server that includes any appropriate hardware and software for integrating with data store 138 as needed to execute aspects of one or more applications for the electronic communications device 104, and may even handle a majority of the data access and business logic for an application. For example, server 134 can be an application server that provides access control services in cooperation with data store 138, and that is able to generate content such as text, graphics, audio, and/or video to be transferred to user 108, which may be served to user 108 by on-demand shipping client application 106 and/or other applications on electronic communications device 104 in the form of HTML, XML, or another appropriate structured language.

In some embodiments, data store 138 can operable, through logic associated therewith, to receive instructions from server 134, and obtain, update, or otherwise process data in response thereto. For example, user 108 can use on-demand shipping client application 106 to request on-demand pickup of item 120. In this case, server 134 can access user information stored in data store 138 to obtain shipping preferences, payment information, and other information of user 108. Server 134 can also obtain from data store 138 shipping cost and transit time information from previous shipments involving the same pickup and destination locations. Such information then may be displayed to user via on-demand shipping client application 106. In some embodiments, user 108 requests and/or receives results via a webpage accessible by a browser application on electronic communications device 104.

Server 134 can include an operating system that provides executable program instructions for the general administration and operation of the server, and it may further include a computer-readable medium storing instructions that, when executed by a processor of the server, allow the server to perform its intended functions. Suitable implementations for the operating system and general functionality of server 134 are known or commercially available, and are readily implemented by persons having ordinary skill in the art, particularly in light of the disclosure herein.

In some embodiments, environment 100 can be a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of environment 100 in FIG. 1 should be taken as being illustrative in nature, and not limiting to the scope of the disclosure.

Figure 2:
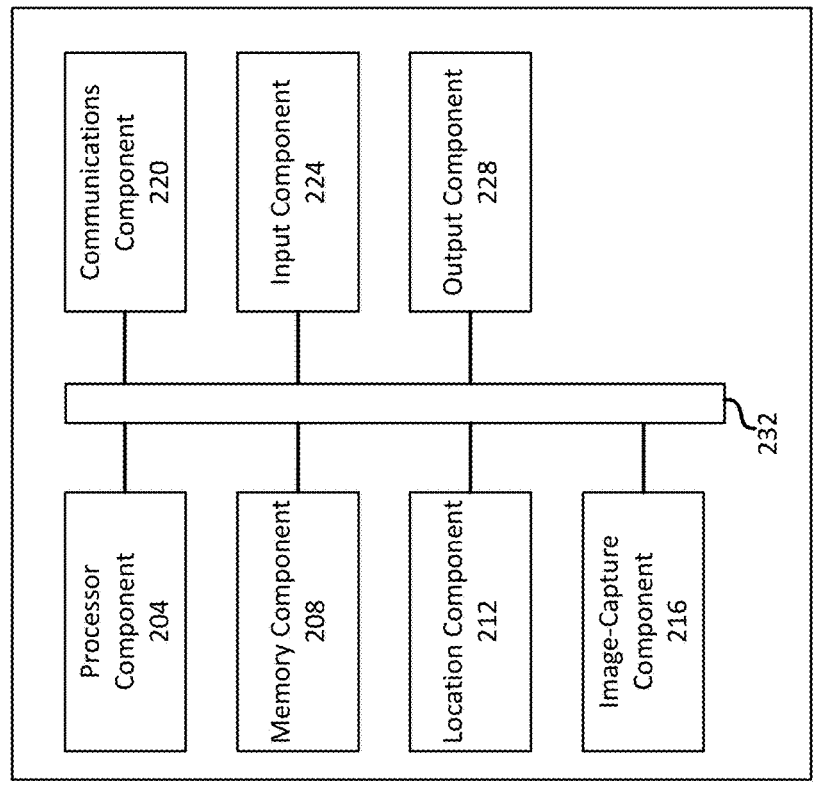
FIG. 2 shows a block diagram of an electronic communications device according to some embodiments.

FIG. 2 shows a block diagram of electronic communications device 104 according to some embodiments. Electronic communications device 104 can be, for example, a mobile phone, a handheld mobile device, a cellular telephone, a user device, a client device, a smartphone (for example without limitation, a smart phone such as: the iPhone® available from Apple Inc. of Cupertino, Calif.; Android™ operating system-based phones, available from as Google of Mountain View, Calif.; and/or the like), a handheld messaging device, a tablet computer, a web pad, a laptop computer, a notebook computer, a handheld computer, a vehicle computer, a personal data assistant (PDA), an electronic book reader, a watch, a wrist worn device, and/or the like.

Electronic communications device 104 can include processor component 204, memory component 208, location component 212, image-capture component 216, communications component 220, input component 224, and output component 228. Each of these components 208, 212, 216, 220, 224, 228 can be software, hardware, and/or a combination of software and hardware.

Processor component 204 can include one or more processors, some or all of which can have one or more cores, or multiple processors. In some embodiments, processor component 204 can include one or more general-purpose processors as well as one or more special-purpose co-processors such as graphics processors, digital signal processors, or the like. In some embodiments, some or all of processor component 204 can be implemented using customized circuits, such as application specific integrated circuits (ASICs) or field programmable gate arrays (FPGAs). In some embodiments, such integrated circuits execute instructions that are stored on the circuit itself. In some embodiments, processor component 204 can execute instructions stored in memory component 208. Processor component 204, or a portion thereof, can be included on board memory for caching purposes, and connected to data bus 232 for providing instructions to the other devices connected to data bus 232.

Memory component 208 can include various memory units, such as a system memory, a read-only memory (ROM), and a permanent storage device. The system memory can be a read-and-write memory device or a volatile read-and-write memory, such as dynamic random access memory. The system memory can store some or all of the instructions and data that processor component 204 needs at runtime. The ROM can store static data and instructions that are needed by processor component 204 and other modules of electronic communications device 104. The permanent storage device can be a read-and-write memory device. This permanent storage device can be a non-volatile memory unit that stores instructions and data even when electronic communications device 104 is powered down. Some embodiments can use a mass-storage device (e.g., flash memory) as a permanent storage device. Some embodiments can use a removable storage device (e.g., memory card, flash drive) as a permanent storage device.

Memory component 208 can include any combination of computer readable storage media, including semiconductor memory chips of various types (RAM, DRAM, SRAM, SDRAM, flash memory, programmable read-only memory) and so on. Magnetic and/or optical disks can also be used. In some embodiments, memory component 208 can include removable storage media that can be readable and/or writeable; examples of such media include flash memory cards (e.g., SD cards, mini-SD cards, micro-SD cards, etc.), compact disc (CD), read-only digital versatile disc, read-only and recordable disks, optical disks, ultra-density optical disks, magnetic disks, and so on. The computer readable storage media do not include carrier waves and transitory electronic signals passing wirelessly or over wired connections.

Memory component 208 can store one or more software programs to be executed by processor component 204, such as an operating system, client interface programs, client applications, and so on. "Software" refers generally to sequences of instructions that, when executed by processor component 204, cause electronic communications device 104 to perform various operations, thus defining one or more specific machine implementations that execute and perform the operations of the software programs. The instructions can be stored as firmware residing in read-only memory and/or applications stored in non-volatile storage media that can be read into volatile working memory for execution by processor component 204. Software can be implemented as a single program or a collection of separate programs or program modules that interact as desired. From memory component 208, processor component 204 can retrieve program instructions to execute and data to process in order to execute various operations described herein, such as software, computer programs, software modules, utility software, system software (e.g., operating system), application software (e.g., on-demand pickup client application 106), firmware, and/or any other data and executable computer code instructions that enable various functions of electronic communications device 104.

Location component 212 can determine or otherwise obtain the geographical position or location of electronic communications device 104. For example, location component 212 can include global positioning system (GPS) receiver for utilizing GPS. Also for example, location component 212 can include other components for utilizing a regional or site-wide positioning system that uses cell tower positioning technology or WiFi technology. Location component 212 is sometimes referred to herein as positioning device or positioning component.

Image-capture component 216 can capture digital images (take pictures) of items. For example, image-capture component 216 can include one or more optical sensors, controllers, lens, and/or other hardware and/or software. In some embodiments, image-capture component 216 includes a built-in camera of electronic communications device 104. In some embodiments, image-capture component 216 includes a scanner. In some embodiments, image-capture component 216 a barcode scanner that obtains information from items, such as obtaining from a tag or label that is associated with an item and that identifies the item and/or describes a physical characteristic and/or other characteristics of the item. In some embodiments, such information can include and/or can be used to determine dimensions, weight, fragility, warnings, hazardous material indicators, temperature sensitive, light sensitive, perishability, etc. of items.

Communications component 220 can receive and transmit information over one or more communications networks, such as network 114. In some embodiments, communications component 220 is capable of receiving and transmitting information over wide area networks (WANs), metropolitan area networks (MANs), campus area networks (CANs), local area networks (LANs), and/or personal area networks (PAN). In some embodiments, communications component 220 is capable of transmitting and receiving information over wireless and/or wired communications channels. In some embodiments, communications component 220 is capable of receiving and transmitting information using one or more communications protocols. For example, communications component 220 can be capable of receiving and transmitting information using global system for mobile communications (GSM), code division multiple access (CDMA), wideband code division multiple access (W-CDMA), Enhanced Data GSM Environment (EDGE), time division multiple access (TDMA), Wi-Fi (such as IEEE 802.11a, IEEE 802.11b, IEEE 802.11g and/or IEEE 802.11n), Bluetooth®, IEEE 802.15.4 (ZigBee), ultra wideband (UWB), Wi-MAX, and/or Voice over Internet Protocol (VoIP). Also for example, communications component 220 can be capable of receiving and transmitting information using protocols for short message services (SMS), multimedia messaging services (MMS), instant messaging services, email services, and/or any other communications protocols, networks, and/or channels including those not yet developed.

Communications component 220 can include any number and combination of network devices and/or network interfaces. In some embodiments, communications component 220 includes a LAN interface for connecting to a wired Ethernet-based network and/or a wireless LAN, such as an IEEE 802.11x wireless network (e.g., WiFi). In some embodiments, the LAN interface may be used to receive information, such as the service set identifier (SSID), channel, and encryption key, used to connect to the LAN. In some embodiments, communications component 220 includes a WAN interface that permits connection to the Internet via a cellular communications network. In some embodiments, communications component 220 includes a PAN interface for connecting to a PAN such as a Bluetooth® network, an IEEE 802.15.4 (ZigBee) network, or an UWB network. In some embodiments, communications component 220 includes and/or interacts with an antenna to transmit and receive radio frequency signals. In some embodiments, communications component 220 includes one or more network interface cards (NIC) and or network controllers.

Communications component 220 can include a near field communication (NFC) interface that allows for close-range communication. In some embodiments, the NFC interface complies with such standards as ISO/IEC 18092, ISO/IEC 14443, ISO/IEC 21481, as well as others known by those of ordinary skill in the art. In some embodiments, for example, the NFC interface may have a range of about 2 to 4 centimeters. In some embodiments, for example, the close-range communication with the NFC interface may take place via magnetic field induction. In some embodiments, for example, such close-range communication allows the NFC interface to communicate with and obtain information tags that are affixed to or located proximate items, such as item 120. In some embodiments, for example, the information obtained from tags may include one or more physical characteristics and/or other characteristics of item, such as weight, size, one or more dimensions, fragility, warnings, hazardous material indicators, temperature sensitive, light sensitive, perishability, etc. In some embodiments, for example, such tags can include NFC tags and/or radio frequency identification (RFID) tags. In some embodiments, for example, the NFC interface may be used to simply 'scan' a tag of item 120 to cause on-demand pickup client application 106 to compose and send an on-demand shipping request message to image processing and item transport service 130.

Communications component 220 can include an interface that is partially or entirely integrated with on-demand shipping client application 106, and can be configured to manage communications between on-demand shipping client application 106 and any of the components of image processing and item transport service 130. For example, on-demand shipping client application 106 can control and/or obtain location information from location component 212 and/or image data from image capture component 216, and on-demand shipping client application 106 can process said location information and/or image data for its own purposes and/or send all or some of said data, either pre- or post-processed, to image processing and item transport service 130.

Input and output components 224, 228 can provide a user interface. Input component 224 can include any device via which a user can provide signals to electronic communications device 104, which can interpret the signals as indicative of particular user requests or information. In some embodiments, input component 224 can include can include any or all of a keypad, touchscreen, touchpad, touch-sensitive buttons, microphone, a voice recognition device, scroll wheel, click wheel, dial, trackball, button, switch, keyboard, keys, trackpad, mouse or other pointing device, and so on. In some embodiments, input component 224 includes include a communication component reader for accepting a communication component, such as a SIM card.

Output component 228 can include any device via which electronic communications device 104 can provide information to a user. For example, output component 228 can include a display to display images generated by electronic communications device 104. The display can incorporate various image generation technologies, e.g., a liquid crystal display (LCD), light-emitting diode (LED) including organic light-emitting diodes (OLED), projection system, cathode ray tube (CRT), a Retina display, or the like, together with supporting electronics (e.g., digital-to-analog or analog-to-digital converters, signal processors, or the like). Some embodiments can include a device such as a touchscreen that functions as both input and output component 224, 228. In some embodiments, other output component 228 can be provided in addition to or instead of a display. Examples include indicator lights, audio speakers, tactile "display" devices, printers, and so on.

In some embodiments, input and output components 224, 228 can interoperate to provide a graphical user interface ("GUI") that allows a user to interact with electronic communications device 104 by using input component 224 to select a control element displayed output component 228 (e.g., by touching the location where a control element is displayed on a touchscreen). In some embodiments, input and output components 224, 228 provide a GUI that enables user 108 to interact with the on-demand shipping application 106. For example, output component 228 can a display graphical icons, buttons, boxes, and/or other graphical components of the GUI that correspond with functions of on-demand shipping application 106, and user 108 may use input component 224 to interact with and thereby control on-demand shipping application 106, such as by touching the appropriate location of a touchscreen or by pressing, sliding, scrolling, or otherwise manipulating tactile input controls.

In some embodiments, on-demand shipping client application 106 is stored in memory component 208 and, when executed by processor component 204, communicates with, is controlled by, controls, and/or is partially and/or entirely integrated with other components of electronic communications device 104. In some embodiments, responsive to control signals from user input device 224, on-demand shipping client application 106 sends corresponding controls signals to location component 212, image-capture component 216, communications component 220, and/or other components of electronic communications device 104. For example, responsive to control signals received from input component 224, on-demand pickup client application 106 can send corresponding controls signals that cause image-capture component 216 to capture a digital image of item 120; that cause location component 212 to determine a current location of electronic communications device 104; and that cause communications component 220 to transmit over network 114 to image processing and item transport service 130 the captured image of item 120 and the determined location of electronic communications device 104.

Figure 3:
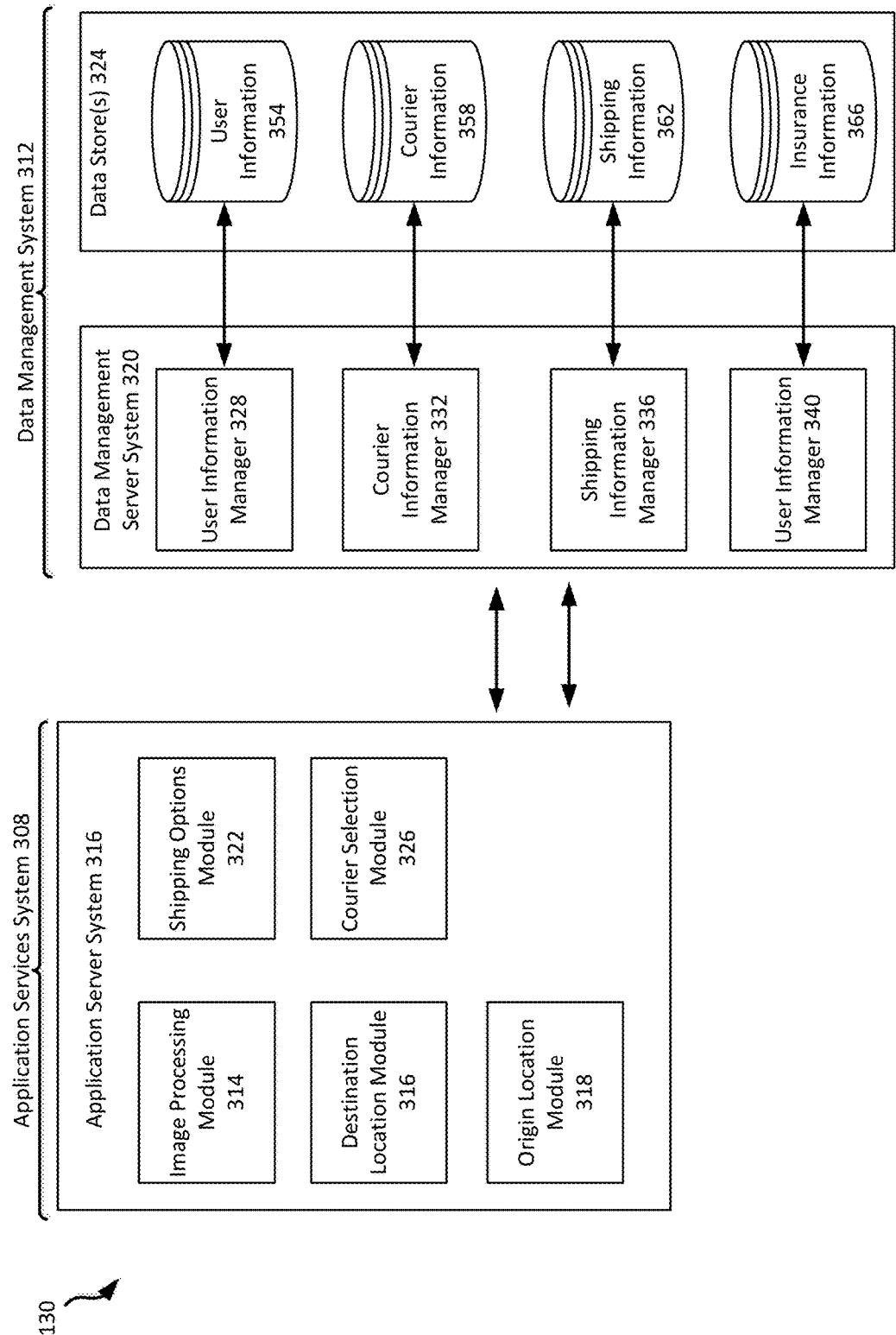
FIG. 3 shows a block diagram of an image processing and item transport service according to some embodiments.

FIG. 3 shows a block diagram of at least a portion of infrastructure 304 of image processing and item transport service 130, according to some embodiments. While infrastructure 304 is illustrated as having a particular structure, it should be understood that certain embodiments may include other structures, including structures with more or less systems, subsystems, layers, and/or other components arranged differently than infrastructure 304. As such, it will be appreciated that image processing and item transport service 130 can be implemented across a plurality of systems and/or subsystems corresponding having varying architectural structures.

Infrastructure 304 may include application services system 308 and data management system 312. In some embodiments, infrastructure 304 may be implemented in or with a distributed computing and/or cloud computing environment with a plurality of servers and cloud-implemented processing, memory, and data resources. Such implementation permits scaling up with additional processing resources, server resources, data storage resources, data management resources, and/or the like.

Application services system 308 and/or data management system 312 can include server systems 316, 320 that one or more application and/or data management servers (e.g., computers, specialized server computers, personal computer servers, UNIX® servers, mid-range servers, mainframe computers, rack-mounted servers, server farms, server clusters, and/or any other appropriate arrangement and/or combination) adapted to run one or more services, operations, processes, or software applications described herein. Such servers can run operating systems and/or additional server applications and/or mid-tier applications, including HTTP (hypertext transport protocol) servers, FTP (file transfer protocol) servers, CGI (common gateway interface) servers, JAVA® servers, database servers, and/or the like. Example data management servers include those commercially available from Oracle, Microsoft, Sybase, IBM (International Entity Machines), and/or the like.

Application services system 308 and/or data management system 312 can include one or more data stores 324. Data stores 324 can include various forms of data storage including solid state storage, disk storage, databases (including relational, column, document, key-value and graph type databases) and cache. In some embodiments, data stores 324 can reside in a variety of locations, such as on a non-transitory storage medium local to and/or resident in server systems 316 and/or 320. In some embodiments, data stores 324 can be located remote from server systems 316 and/or 320 and in communication with server systems 316 and/or 320 via a network-based or dedicated connection. In some embodiments, data stores 324 can may reside in a storage-area network (SAN). In some embodiments, any necessary files for performing the functions attributed to server systems 316 and/or 320 may be stored locally on server systems 316 and/or 320 and/or remotely, as appropriate.

In some embodiments, data management server system 320 can operate one or more applications to analyze and/or maintain in data store 324 information related to users, couriers, shipping companies, insurance providers, and/or the like. Such data may be obtained via data feeds and/or event updates received from various data sources. For example, data management server system 320 can include user information manager 328 for analyzing and/or maintaining user information 354, courier information manager 332 for analyzing and/or maintaining courier information 358, shipping information manager 336 for analyzing and/or maintaining shipping information 362, and insurance information manager 340 for analyzing and/or maintaining insurance information 366.

User information 354 can include information relating to a plurality of individual users. For example, user information 354 can include a user's (1) personal information, such as age, gender, current location information (e.g., city, region, address), phone numbers, email addresses, social network memberships, payment information (credit card or bank account information and billing address), login identifier, password, and/or the like; (2) historical shipping information, such as information that identifies previously shipped items and corresponding information that relates to the pickup location, the destination location, the courier, the shipping company, shipping cost, service level (priority, regular, two-day, next day, etc.), actual transit time, and any relevant notes, information, and/or feedback from the user, the courier, the shipping company, the recipient, and/or any other relevant party; (3) user preference information, such as preferred pickup locations, preferred destination locations, preferred couriers, preferred shipping companies, preferred service level and costs (priority, regular, two-day, next day, etc.), preferred insurance companies and rates, and/or other shipping preferences; (4) historical location information, such as information that identifies preferred, historical, and/or predicted pickup and/or destination locations; (5) historical item information, such as images, dimensions, weight, fragility, special conditions, identifiers, barcodes, and/or any other suitable characteristics and/or identifying information for items that the user has previously shipped and/or that user is predicted to ship; (6) frequency information, such as how often and/or when user requests on-demand pickup and/or ships particular and/or categories of items, how often and/or when particular and/or categories of pickup and/or destination location are used, etc.

As described below, user information 354 can be used to facilitate one-click shipping. For example, when in one-click shipping mode, the user can take a photo of an item, and a shipping request is auto-generated using the profile information and the photo.

User information 354 can be obtained through various mechanisms. For example, users may expressly input and provide the user information through on-demand shipping client application 106 and/or another application running on electronic communications device 104, and/or by accessing image processing and item transport service 130 via a web browser from any computing device. For example, on-demand shipping client application 106 and/or an application or module of image processing and item transport service 130 may enable a user to create and manage a user profile and/or account that is incorporated into user information data store 354. In some embodiments, for example, user information 354 can be obtained from a database of recorded historical shipments (online and offline), such as from third-party database associated with and/or maintained by merchants, shipping companies, couriers, and/or the like.

Courier information 358 can include, for example, current and historical information related to couriers, such as personnel and/or equipment capacity and/or capability, as well as customer reviews and/or ratings, pricing, available schedules, coverage area, contact information, and/or the like. "Courier" as used herein can refer to an individual and/or company, organization, or group of individuals having personnel and/or equipment (e.g., vehicle) for picking up and/or transporting items, such as goods or documents. In some embodiments, couriers pick up items at a user's location (e.g., user's house or place of business), and transport those items to a packing-and-shipping location, where the items are packaged and shipped to an ultimate destination (e.g., handed off to a shipping company). Courier information 358 can include real-time and/or near real-time location and/or availability information. For example, such information can include a phone number, application identifier, and/or other information that enables real or near real-time tracking of a courier's location. The location could be expressed in terms of GPS location, address, city, state, region, and/or country. The location could also be the name or other identifying information of the business entity where the courier is located (e.g., currently picking up an item), such as a business, a restaurant, a venue, etc.

Courier information 358 can also include information related to a courier's availability. Such information can include a list of the courier's recent pickups and scheduled future pickups, as well as information about the size and weight of the items at each pickup and/or information about the courier's capacity (i.e., aggregated size and weight of items the courier can carry at one time). Additionally, courier information 358 can include indications of what types of items a courier is equipped to handle. For example, larger items can be assigned to couriers with trucks or vans, documents may be assigned to bike couriers, hazardous materials may be assigned to couriers with the requisite licenses, certifications, or training, etc.

Courier information 358 can also include historical data relating to a courier's past deliveries and pickups. For example, courier information 358 include a table of pickup identifiers and corresponding time, location, and/or user data for the instances where the courier has picked up and/or delivered items. Such courier information 358 can include user reviews, incidents where property was damaged or lost, and other data that may be helpful when selecting couriers. Patterns may emerge that enable better customer service and/or more efficient assignment of couriers. An example pattern indicates that a particular courier frequently picks up and/or delivers to a particular user. As such, that courier may be designated a preferred courier for that user, and selected even over other couriers who may be closer and/or have more capacity. Another example involves matching couriers with users based on positive user reviews and/or user requests for specific couriers.

Shipping information 362 can include cost and performance data for multiple shipping companies. "Shipping company" as used herein can refer to a company and/or organization that transporting items, such as goods or documents. In some embodiments, couriers transport items locally (e.g., intracity), whereas shipping companies transport items longer distances (e.g., intercity). Image processing and item transport service 130 can use shipping information 362 to compare shipping costs and/or performance of multiple shipping companies, and use that comparison to select and/or recommend one or more shipping companies and/or service levels for shipping an item. In some embodiments, shipping information 362 enables comparisons that account for particular routes, service levels, insurance options, customer reviews and/or satisfaction, reputation, how frequently actual transit times match service levels, how frequently damage occurs, how quickly and frequently insurance claims are honored and/or items are repaired and/or replaced, and/or the like. For example, image processing and item transport service 130 can use shipping information 362 to price compare across multiple shipping companies and get the best price (select and/or recommend the lowest available shipping cost) for an item that has a particular dimension and/or weight and that is being shipped from a particular original location to a particular destination location at a particular service level (e.g., two-day, next day, etc.).

Shipping information 362 can include current shipping information. For example, image processing and item transport service 130 can maintain current shipping cost information from multiple shipping companies, and use this current shipping cost information to price compare and get the best price and/or service for a particular shipment. Current shipping cost information can account for multiple routes (i.e., route between origin and destination location), service levels, insurance options, and/or the like. In some embodiments, image processing and item transport service 130 obtains discounts from various shipping companies, and includes information related to those discounts in the current shipping cost information.

Shipping information 362 can also include historical shipping information. For example, image processing and item transport service 130 can maintain historical shipping information for some or all previous shipments across all shipping companies, and can use this information to price compare and/or get the best price (e.g., select and/or recommend the lowest available shipping cost) for shipping an item. For example, shipping information 362 can include shipping cost, service level, actual shipping time, customer review (sender and/or recipient), indications of whether any property damage or significant delays and/or other problems occurred. Image processing and item transport service 130 can use such historical shipping information to compare shipping cost and/or performance of various shipping companies based on actual data, not just data published by individual shipping companies. For example, image processing and item transport service 130 can use such historical shipping information to determine which shipping companies are faster, more reliable, and/or cheaper on certain routes, at certain periods (e.g., weekday, weekend, holiday), at certain service levels, with packages having certain properties (weight, dimensions, fragility, special handling). In one example, two companies may offer a "Next Day" service level, but image processing and item transport service 130 may select one over the other because shipping information 362 may show that one is constantly an hour or two faster than the other.

Insurance information 366 can include data related to insurance rates and/or quality for multiple insurance providers. image processing and item transport service 130 can use insurance information 366 to compare insurance rates and/or quality across multiple insurance providers, and use that comparison to select and/or recommend one or more insurance products and/or insurance providers for a shipment. In some embodiments, insurance information 366 enables comparisons that account for type of item, value of item, type of damage covered, fragility of item, special handling, destination location, origin location, route from destination to origin location, claim processing speed, number and/or frequency submitted insurance claims, percentage of claims honored (e.g., how frequently insurance claims are honored and/or items are repaired and/or replaced), reimbursement/payout amount, ratio of item value to reimbursement/payout amount, insurance options, plans, and/or coverage amounts, customer reviews and/or satisfaction, reputation, the shipping company used to ship the item, and/or the like. For example, insurance information 366 can be used to recommend the cheapest and/or most reliable insurance for a particular item being shipped from a particular origin to a particular destination at particular service level and/or by a particular shipping company.

Insurance information 366 can include current insurance information. For example, image processing and item transport service 130 can maintain current insurance rate information from multiple insurance providers, and use this current insurance rate information to price compare and get the best price and/or quality for a particular shipment. Current insurance rate information can account for type of item, value of item, coverage amount, type of damage to be covered, fragility of item, special handling required for item, destination location, origin location, route from destination to origin location, and/or the like. In some embodiments, image processing and item transport service 130 obtains discounts from various insurance providers, and includes information related to those discounts in the current insurance rate information.

Insurance information 366 can also include historical insurance information. For example, image processing and item transport service 130 can maintain historical insurance information for some or all previous shipments across all insurance providers, and can use this information to price compare and/or get the best price (e.g., select and/or recommend the lowest available insurance rate for insurance that suits a user's needs) for a shipment. For example, insurance information 366 can include historical information from previous shipments, including insurance rate, type of item, value of item, type of damage covered, fragility of item, special handling, destination location, origin location, route from destination to origin location, whether a claim was made and/or honored, claim processing speed, reimbursement/payout amount, ratio of item value to reimbursement/payout amount, customer review and/or satisfaction, the shipping company used to ship the item, and/or the like. Image processing and item transport service 130 can use such historical insurance information to compare insurance rates and/or quality across various insurance providers based on actual data, not just data published by the insurance providers themselves. For example, image processing and item transport service 130 can use such historical insurance information to determine which insurance companies offer better and/or cheaper insurance on certain routes, at certain periods (e.g., weekday, weekend, holiday), with items having certain properties (value, replacement value, fragility, special handling). In one example, two providers may offer a coverage for the same rate, but image processing and item transport service 130 may select one over the other because insurance information 362 may show that one has a faster claim processing time, honors a higher number of claims, has better customer reviews, and/or the like.

In some embodiments, application server system 316 can operate one or more applications and/or modules to facilitate aspects of image processing and item transport services, including but not limited to aspects of processes 400, 600, 800, 1000, 1100, 1300, 1400 of FIGS. 4, 6, 8, 10, 11, 13. In some embodiments, application server system 308 can include image processing module 314, destination location module 316, origin address module 318, shipping options module 322, and courier selection module 326, and/or other modules, programs, applications, and/or the like. Modules 314, 316, 318, 322 are discussed below with reference to processes 400, 600, 800, 1000, 1100, 1300, 1400.

FIGS. 4, 6, 8, 10, 11, 13 illustrate example processes 400, 600, 800, 1000, 1100, 1300, 1400 related to aspects of image processing and item transport services, according to some embodiments. Some or all of processes 400, 600, 800, 1000, 1100, 1300, 1400 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory. The one or more computer systems may be, as an example, one or more computer systems in one or more environments 100, 1600, 1700 of FIGS. 1, 16-17, respectively, including electronic communications device 104 and/or image processing and item transport service 130 as described in FIGS. 2-3, respectively.

Figure 4:
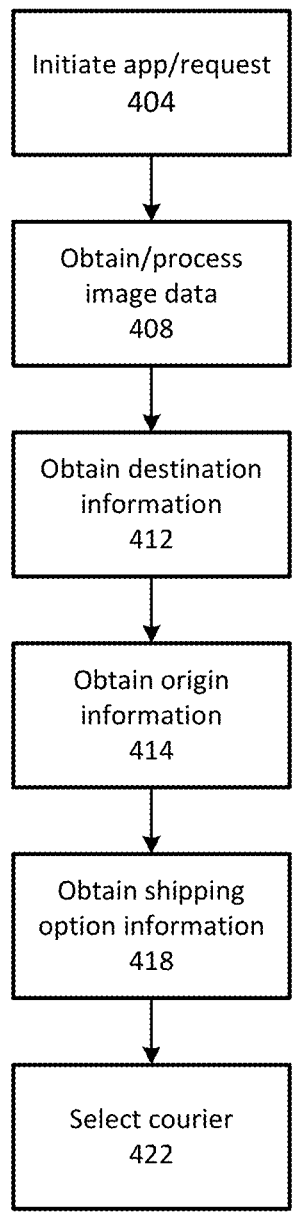
FIG. 4 shows a flow diagram of a process for image processing and item transport according to some embodiments.
Figure 5A:
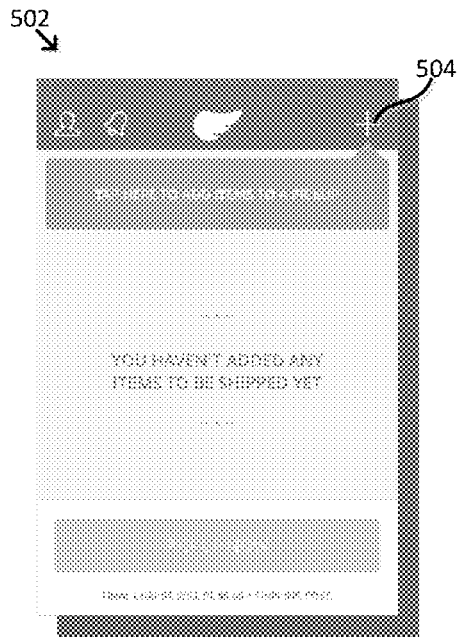
FIGS. 5A-D show graphical user interfaces according to some embodiments.

FIG. 4 shows a flow diagram of process 400 for providing image processing and item transport services, according to some embodiments. As indicated at block 404, process 400 generally begins when user 108 launches on-demand pickup client application 106 operating on electronic communications device 104 and inputs information, some or all of which may be sent to image processing and item transport service 130. Such inputted information can cause image processing and item transport service 130 to dispatch a courier a current location of user 108, pickup item 120 that user 108 wants to ship to a destination location, and take item 120 to a packing-and-shipping facility, where item 120 is packaged and handed over to a shipping company. FIG. 5A shows user interface 502 that enables user 108 to initiate a pickup request and/or add one or more items to an existing pickup request. In some embodiments, for example, user 108 can initiate the request by selecting the "+" icon 504.

Figure 5B:
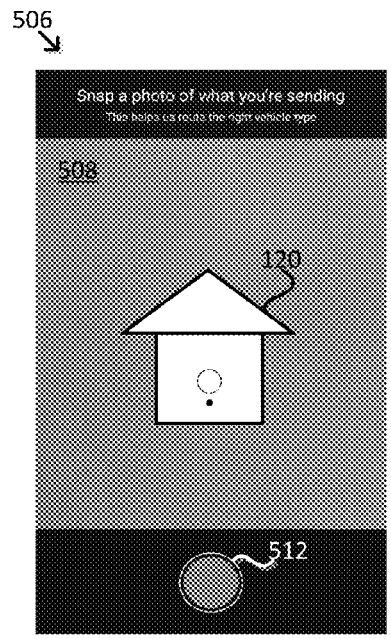
Figure 5C:
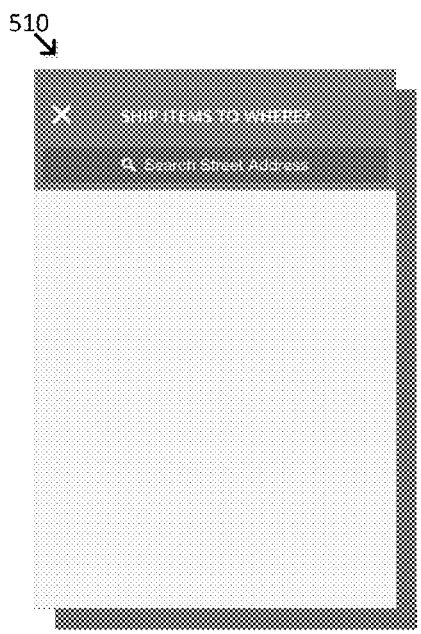
Figure 6:
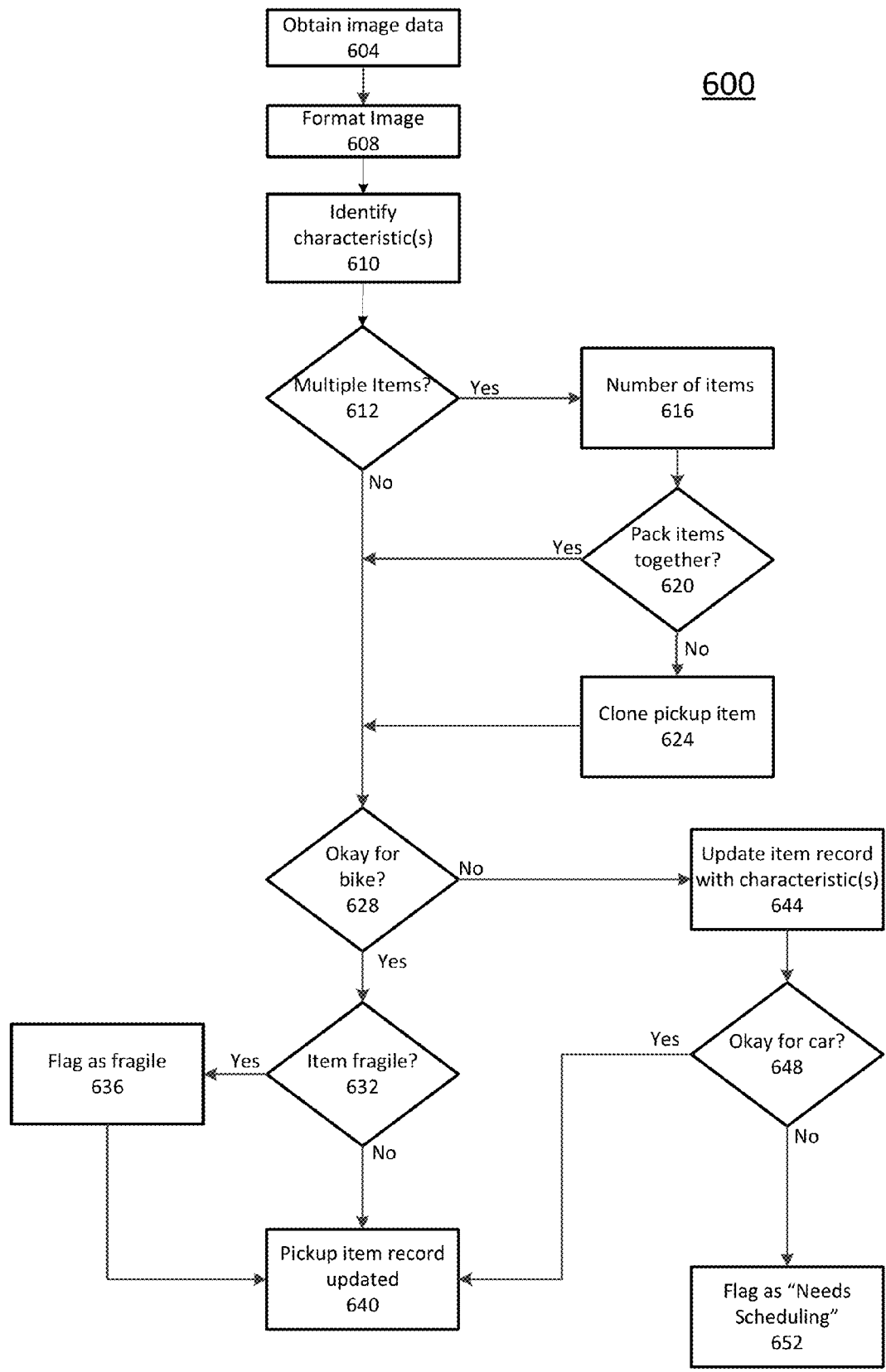
FIG. 6 shows a flow diagram of a process for obtaining and/or processing image data related to an item according to some embodiments.

Referring again to FIG. 4, image data related to item 120 is obtained and/or processed, as indicated at block 408. Example embodiments for obtaining and/or processing image data (block 408) are described below with additional reference to FIGS. 5B and 6. FIG. 5B shows user interface 506 that enables user 108 to obtain and/or process image data related to item 120, according to some embodiments. FIG. 6 shows process 600 for obtaining and/or processing image data related to item 120, according to some embodiments. In some embodiments, image processing component 314 of application services system 312 (FIG. 3) communicates and/or coordinates with on-demand pickup client application 106 of electronic communications device 104 (FIGS. 1 & 3) to implement aspects of process 600 (FIG. 6) and/or display user interface 506 (FIG. 5B). In some embodiments, image processing component/module 314 and/or on-demand pickup client application 106 can directly and/or indirectly query and/or write to one or more of data stores 354, 358, 362, 366 when implementing aspects of process 600. For example, image processing module 314 and/or on-demand pickup client application 106 can directly and/or indirectly retrieve, update, and/or analyze image data in one or more of data stores 354, 358, 362, 366. Also for example, image processing module 314 and/or on-demand pickup client application 106 can directly and/or indirectly retrieve, update, and/or analyze other information, such as information related to item 120, user and/or user preferences, pickup location, destination location, pickup location data, and/or other information relevant to picking up and shipping item 120.

At block 604, process 600 generally begins with obtaining or acquiring an digital image and/or image data related to item 120. In some embodiments, image data can be a digital image. In some embodiments, image data can be obtained when user 108 takes a picture of item 120 using image-capture component 216 of electronic communications device 104. As noted, FIG. 5B shows user interface 506 that can be provided for enabling user 108 to cause image-capture component 104 to capture an image of item 120. For example, user 108 can position electronic communications device 104 such that a digital representation of item 120 appears in window 508, and select icon 512 to cause image-capture component 216 to capture a digital image of item 120. It should be appreciated that image data related item 120 can be obtained multiple ways. For example, user may be provided with an option of selecting a stored digital image of item 120 from memory 208 of electronic communications device 104 and/or from one or more of data stores 354, 358, 362, 366 of image processing and item transport service 130. Also, for example, a digital image of item 120 may be obtained from a third-party application, website, service, and/or the like.

At block 608, the obtained digital image and/or image data can be formatted. In some embodiments, at block 608, the formatting involves processing the digital image and/or image data to obtain a data representation of the item represented in the digital image. For example, the digital image can be processed so as to isolate and/or identify data that represents the item, such as item 120, which is the subject of the digital image. In some embodiments, at block 608, the formatting can involve image processing and item transport service 130, upon obtaining a digital image, converting that digital image to a suitable format for storing, analyzing, and/or using the digital image for any steps, operations, services, and/or techniques disclosed herein. In some embodiments, at block 608, the formatting can involve on-demand pickup client application 106 of electronic communications device 104 processing a digital image to convert that digital image to format suitable for transmitting to image data to image processing and item transport service 130.

At block 610, the digital image, image data, and/or data representation of item 120 can be processed to estimate, determine, and/or identify one or more dimensions, a dimensional size, a dimensional weight, and/or other characteristic(s) of item 120, which is represented in the digital image. Other determined characteristics include item weight, category, type, and/or the like. In some embodiments, image processing technology known to those having skill in the art can be used to estimate, determine, and/or identify one or more dimensions, a dimensional size, a dimensional weight, and/or other characteristic(s) of item 120. At block 612, the obtained digital image of item 120 can be processed to determine whether multiple items are represented and/or included in the digital image. At block 616, if multiple items are included, the number and/or one or more characteristics of the items can be determined. For example, the images can be processed to count the number of discrete items represented in the image. At block 616, process 600 involves determining whether the items can be packed and/or transported together is made based on the determined number and/or characteristic(s) of the items. At block 624, if the items cannot be packed and/or transported together, image and/or pickup request/record can be cloned such that the number of images and/or pickup requests/records corresponds to the number of separate packages required, and then process proceeds to block 628. For example, if a single image includes two items that require separate packaging, two pickup requests/records can be generated—one for each item. Pickup requests are sometime referred to herein as transport instructions. In some embodiments, image processing and item transport service 130 can output transport instructions for receipt by user or entities associated with couriers selected for picking up and transporting item 120. Referring again to blocks 612 and 620, respectively, if the image does not include multiple items or if the image includes multiple items that can be packed and/or transported together, process 600 proceeds to block 628, where process 600 involves determining whether item 120 is suitable for bicycle transport. For example, the item characteristic(s) (e.g., dimension(s), volume, weight, etc.) obtained by processing the image data related to item 120 and/or obtained via user input can be used to determine whether item 120 is suitable for bicycle transport. If the item 120 is determined to be suitable for bicycle transport, process proceeds to block 632.

At block 632, process 600 involves determining whether item 120 is fragile. For example, the item characteristic(s) (e.g., dimension(s), volume, weight, etc.) obtained by processing the image data related to item 120 and/or obtained via user input can be used to determine whether item 120 is fragile. At blocks 636 and 640, process 600 involves updating the transport instruction, pickup request, and/or pickup record for item 120 to indicate whether item 120 is fragile. For example, information related to whether item 120 is fragile and/or other characteristics (e.g., dimension(s), volume, weight, etc.) of item 120 can be used to select a suitable courier and/or communicated to the courier so that the courier knows how to properly handle and transport item 120. Referring again to block 628, if item 120 is determined not to be suitable for bicycle transport, process 600 proceeds to block 644, where process 600 involves updating the pickup request/record with information related to one or more characteristic of item 120. For example, the pickup request/record can be updated to include the characteristic(s) (e.g., dimension(s), volume, weight, etc.) obtained by processing the image data related to item 120 and/or obtained via user input. At block 648, process 600 involves determining whether item 120 is suitable for car transport. For example, the item characteristic(s) (e.g., dimension(s), volume, weight, etc.) obtained by processing the image data related to item 120 and/or obtained via user input can be used to determine whether item 120 is suitable for car transport. If item 120 is suitable for car transport, process 600 involves updating the pickup request/record for item 120 to indicate that item 120 is suitable for car transport, as indicated at block 640. On the other hand, if item 120 is not suitable for car transport, process 600 involves flagging the pickup request/record for item 120 to indicate that freight pickup needs to be scheduled, as indicated at block 652.

Figure 7A:
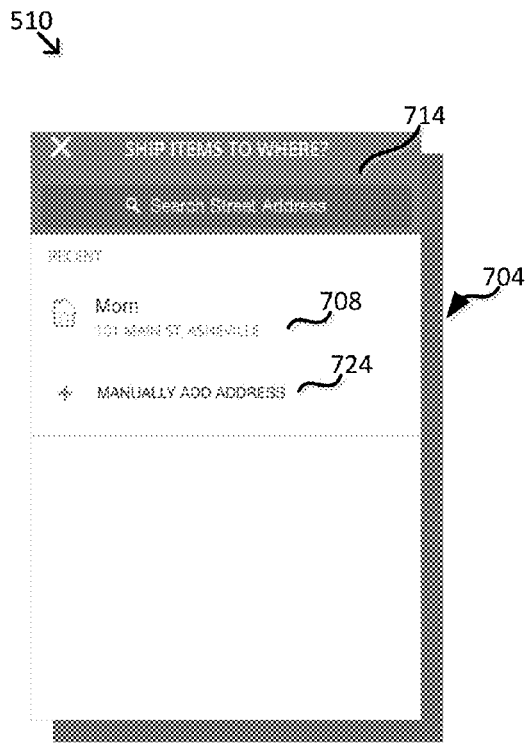
FIGS. 7A-D show graphical user interfaces according to some embodiments.
Figure 7B:
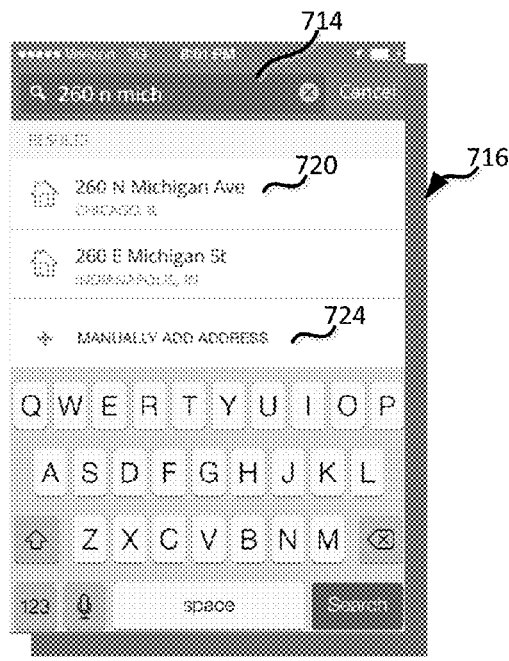
Figure 7C:
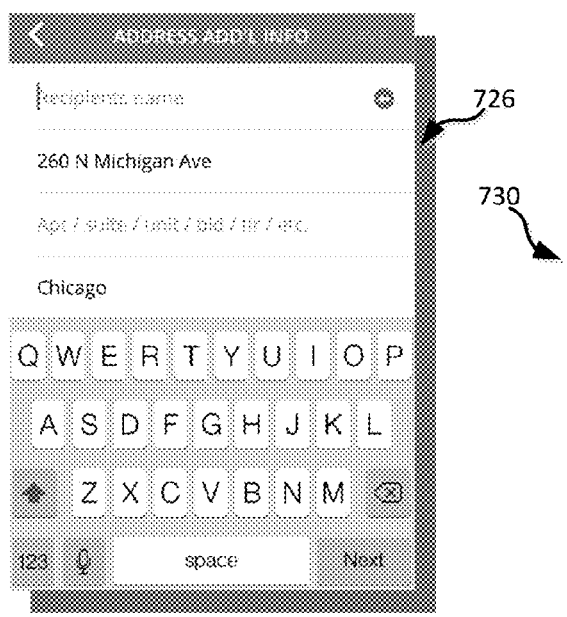
Figure 7D:
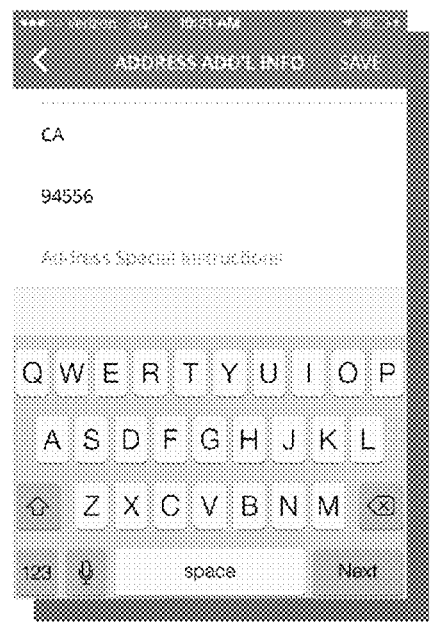
Figure 8:
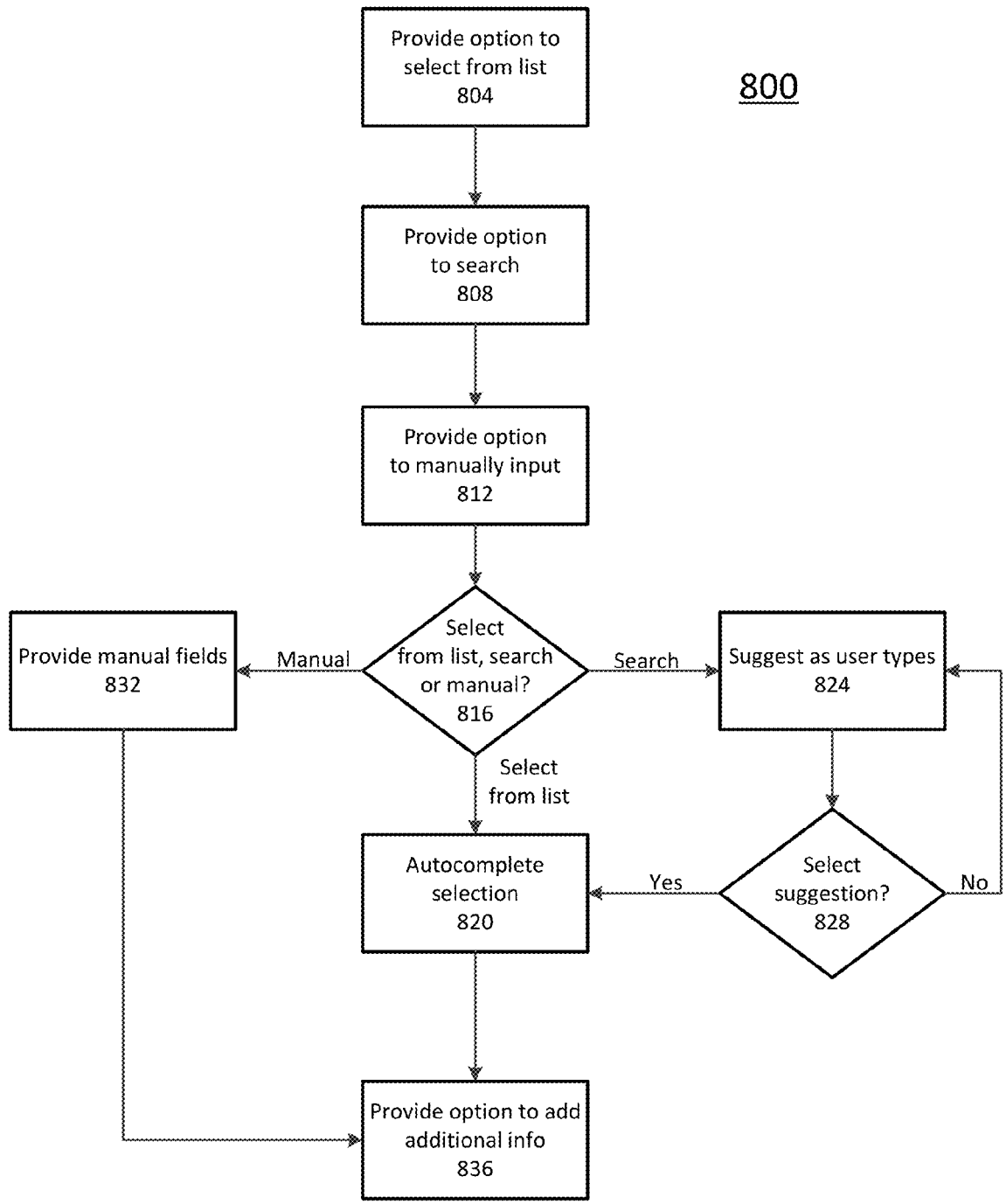
FIG. 8 shows a flow diagram of a process for obtaining a destination location according to some embodiments.

Referring again to FIG. 4, destination information can be obtained, as indicated at block 412. Example embodiments for obtaining destination information (block 412) are described below with additional reference to FIGS. 5C, 7A-D and 8. FIGS. 5C and 7A-D show user interface 510 that enables user 108 to input destination information, according to some embodiments. FIG. 8 shows process 800 for obtaining destination information, according to some embodiments. In some embodiments, destination location module 316 of application services system 312 (FIG. 3) communicates and/or coordinates with on-demand pickup client application 106 of electronic communications device 104 (FIGS. 1 & 3) to implement aspects of process 800 (FIG. 8) and/or display user interface 506 (FIGS. 5C, 7A-D). In some embodiments, destination location module 316 and/or on-demand pickup client application 106 can directly and/or indirectly query and/or write to one or more of data stores 354, 358, 362, 366 when implementing aspects of process 800. For example, destination location module 316 and/or on-demand pickup client application 106 can directly and/or indirectly retrieve, update, and/or analyze destination information, such as recent destination locations (e.g., ship-to addresses), in one or more of data stores 354, 358, 362, 366. Also for example, destination location module 316 and/or on-demand pickup client application 106 can directly and/or indirectly retrieve, update, and/or analyze other information, such as information related to the item, user and/or user preferences, pickup location, image data, pickup location data, and/or other information relevant to picking up and shipping item 120.

At block 804, an option to select a destination location from a pre-populated list can provided. For example, a list of possible destination locations 704 can provided based on user preferences, user history, current location, information about the item to be shipped, and/or the like. Rather than inputting (e.g., typing) details of the destination location (e.g., name, address, etc.), user 108 can simply select a destination location from the list of possible destination locations 704. For example, the list of possible destination locations 704 can include one or more destination locations that user 108 recently shipped to and/or frequently ships to. For example, the list of possible destination locations 704 includes recent destination location 708. Rather than having to input destination location information details (e.g., the recipient's name and address), user 108 can simply select recent destination location 708 and the details are auto-populated. In some embodiments, information about the item to be shipped is used to populate the list of possible destination locations 704. For example, the captured image of item 120 is processed and compared with stored images of previous items that user 108 previously shipped to determine if item 120 is similar to any previously shipped items (e.g., same type or category of item). If any similar items are identified, the corresponding destination locations of those items can be included in the list of possible destination locations 704.

As indicated at block 808, an option to search for a destination location can be provided. For example, search bar 714 can be provided, and user 108 can search for a destination location by inputting information related to one or more destination location (e.g., recipient's name and/or address). In some embodiments, user 108 can input the first few characters of a name, address, and/or other information that corresponds with the destination location, and a list of "auto completion" suggestions 716 can be provided based at least in part on the inputted information. User 108 can select one of suggestions 720 to cause address and/or other destination information to be autocompleted. For example, as illustrated in FIG. 7B, rather than inputting (e.g., typing into a keypad) an entire address "260 n michigan ave chicago il" of the destination location, user 108 can simply select suggestion 720 to cause the entire address to be autocompleted.

At block 812, an option to manually input a destination location can be provided. For example, manual input icon 724 can be provided and, upon user 108 selecting manual input icon, manual input field can be provided for enabling user 108 to manually input information corresponding to one or more destination locations. FIG. 7C at 726 illustrates that user 108 can manually input "recipient's name" and an apartment, suite, floor number, etc.

At block 816, process 800 can involve determining whether user selects a destination location from the list of possible destination locations 704, starts typing a query into search bar 714, or selects the manual input icon 724. At block 820, if user selects a destination location from the list of possible destination locations 704, process 800 involves autocompleting detailed information that corresponds to the selected destination location. Referring again to block 816, if user 108 starts typing a query, process 800 involves providing a list of "auto completion" suggestions 716 as user 108 types the query, as indicated at block 824. At block 828, process 800 can involve determining whether user selects a destination location from the list of "auto completion" suggestions 716. If so, process 800 involves autocompleting detailed information that corresponds to the selected destination location, as indicated at block 820. Otherwise, process 800 continues providing "auto completion" suggestions 716 as user 108 types the query, as indicated at block 824. Referring again to block 816, if user 108 selects the manual input icon 724, process 800 involves providing input fields for inputting destination information, such as recipient name and address, as indicated at block 832.

At block 836, user 108 can be provided with an option of adding additional information. FIG. 7D at 730 illustrates that user 108 can input special instructions, such as instructions for handling and/or processing items and/or packages at the packaging and shipping facility and/or shipping company. For example, special instructions, such as "as fast as possible," "fragile," "books," etc., can instruct the packaging and shipping facility on what kind of packaging to use, how to label the package, which postage to apply, whether to expedite packing, etc. Also for example, special instructions, such as "backdoor, c/o John Doe, leave at reception, etc.," can instruct the packaging and shipping facility to properly label the package, and can instruct the shipping company how handle the package and where to leave the package at the destination location to ensure that the package reaches the correct person, department, or other location or organization at the destination location.

Figure 9A:
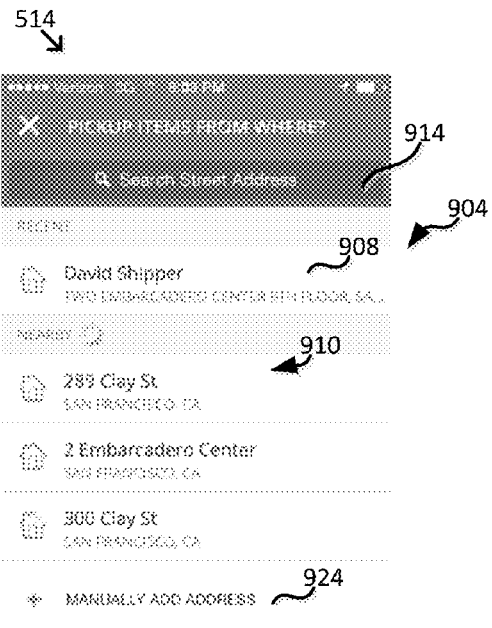
FIGS. 9A-D show graphical user interfaces according to some embodiments.
Figure 9B:
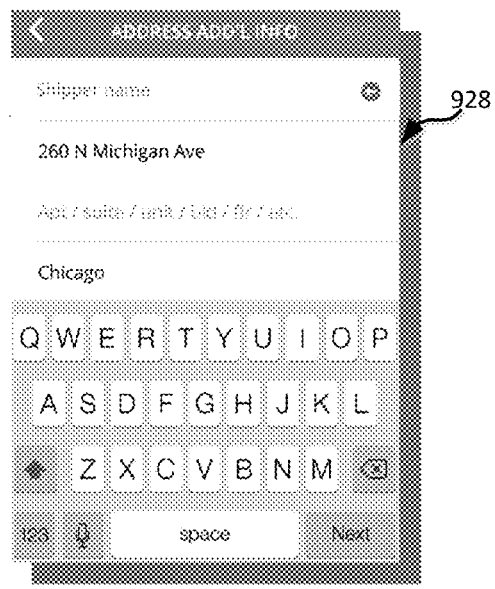
Figure 9C:
Figure 9D:
Figure 10:
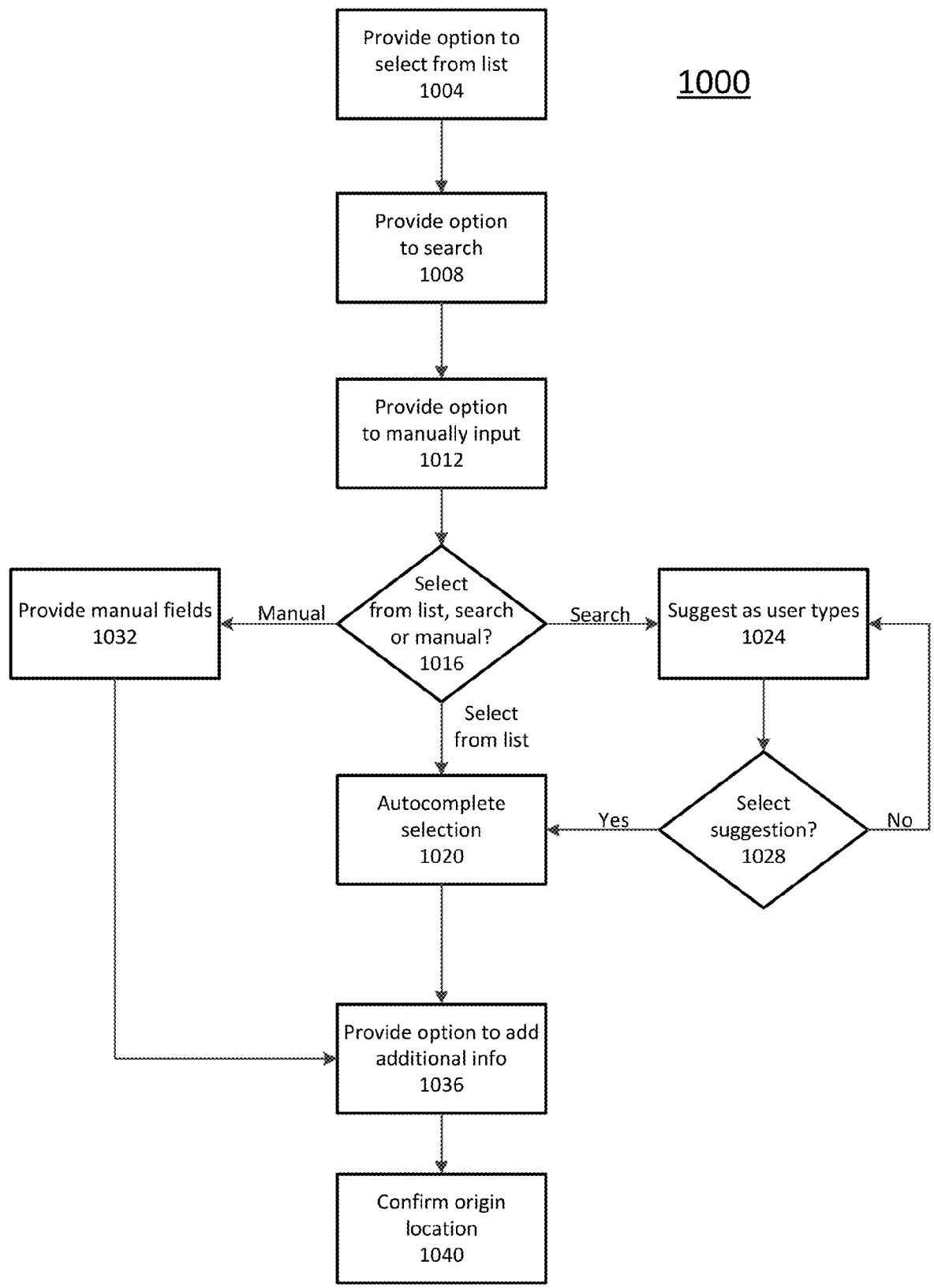
FIG. 10 shows a flow diagram of a process for obtaining a pickup and/or current location according to some embodiments.
Figure 11:
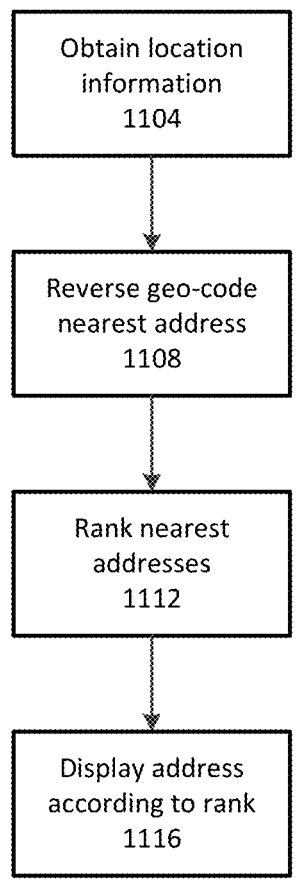
FIG. 11 shows a flow diagram of a process for providing a list of possible pickup and/or current locations according to some embodiments.

Referring again to FIG. 4, origin information can be obtained, as indicated at block 414. In some embodiments, the origin information corresponds to a pickup location where user 108 wishes to have item 120 picked up and carried away for packaging and shipping. Example embodiments for obtaining origin information (block 414) are described below with reference to FIGS. 5D, 9A-D, 10 and 11. FIGS. 5D and 9A-D show user interface 514 for enabling user 108 to input origin information, according to some embodiments. FIG. 10 shows process 1000 for obtaining origin information, according to some embodiments. FIG. 11 shows process 1100 for providing a list of possible origin locations, according to some embodiments. In some embodiments, origin location module 318 of application services system 312 (FIG. 3) communicates and/or coordinates with on-demand pickup client application 106 of electronic communications device 104 (FIGS. 1 & 3) to implement aspects of process 1000 (FIG. 10) and/or display user interface 514 (FIGS. 5D, 9A-D). In some embodiments, origin location module 318 and/or on-demand pickup client application 106 can directly and/or indirectly query and/or write to one or more of data stores 354, 358, 362, 366 when implementing aspects of processes 1000 and 1100. For example, origin location module 318 and/or on-demand pickup client application 106 can directly and/or indirectly retrieve, update, and/or analyze origin information, such as recent pickup locations, in one or more of data stores 354, 358, 362, 366. Also for example, origin location module 318 and/or on-demand pickup client application 106 can directly and/or indirectly retrieve, update, and/or analyze other information, such as information related to the item, user and/or user preferences, pickup location, image data, pickup location data, and/or other information relevant to picking up and shipping item 120.

As indicated at block 1004, process 1000 generally begins by providing an option to select origin location from a pre-populated list. For example, a list of possible origin locations 904 can provided based on user preferences, user history, current location, information about the item to be shipped, and/or the like. Rather than inputting (e.g., typing) details of the original location (e.g., name, address, etc.), user 108 can simply select an origin location from the list of possible origin locations 904. For example, the list of possible origin locations 904 can include one or more origin locations where user 108 recently requested and/or frequently requests pickup. For example, the list of possible origin locations 904 includes recent origin location 908, the last origin location used, a default origin location. Rather than having to input origin location information details, user 108 can simply select recent origin location 908 and the details are auto-populated. In some embodiments, information about the item to be shipped is used to populate the list of possible origin locations 904. For example, the captured image of item 120 is processed and compared with stored images of previous items that user 108 previously shipped to determine if item 120 is similar to any previously shipped items (e.g., same type or category of item). If any similar items are identified, the corresponding origin locations of those items can be included in the list of possible origin locations 904.

In some embodiments, as shown by process 1100 of FIG. 11, location information that corresponds to the current location of user 108 information can be used to populate the list of possible origin locations 904 with a rank-ordered list of nearby origin locations 910. As indicated at block 1104, process 1100 generally begins by obtaining location information that corresponds to a location of electronic communications device 104 of user 108. For example, position information can be obtained from location component 212 of electronic communications device 104. Also for example, rather than or in addition to obtaining directly from electronic communications device 104 itself, position information of electronic communications device 104 can be obtained from a third-party, such as a wireless telecommunications company, an authentication company, and/or another third-party entity that has access to position information for electronic communications device 104. In some embodiments, position information can be real-time information or near real-time information. In some embodiments, position information can include and/or relate to GPS coordinates (i.e., latitude and longitude) that correspond to a location of electronic communications device 104 of user 108. At block 1108, process 1100 involves reverse geocoding the obtained position information to determine and/or obtain one or more nearby addresses. In some embodiments, the nearby addresses can be provided in five-meter increments. At block 1112, the obtained nearby addresses can be ranked based on proximity to electronic communications device 104 of user 108 and quality of the address. For example, quality of an address can be based on whether the address complies with formatting used by the US Postal Service and/or if it is recognized as an address by the US Postal Service. Also for example, quality can be based on whether user 108 or other uses of image processing and item transport service 130 have previously used the address as an origin or destination address. Further, quality can be based on whether the address is listed in a residential and/or business directory, such as a phonebook. At block 1116, process 1100 involves displaying to user 108, via electronic communications device 104, the rank-order list of nearby origin locations 910.

Figure 5D:
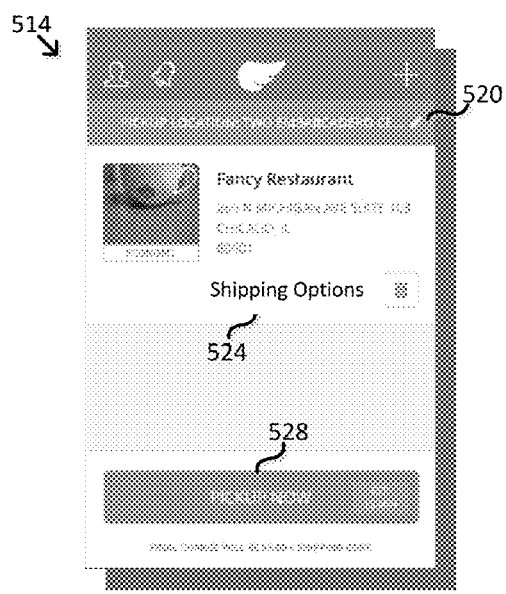

In some embodiments, rather than or in addition to providing the list of possible origin locations 904, user 108 can be provided with a signal predicted/suggested origin location, such as pickup location 520 of FIG. 5D. In some embodiments, pickup location 520 can be the latest origin location used by user 108, a default location, the nearest location relative the current location of user 108, and/or the nearest location previously used by user 108 as a pickup location. In some examples, pickup location 520 could be a market or warehouse where items are commonly picked up for shipping. In this case pickup location 520 can be the nearest location that is commonly used by multiple users (this could be the pickup location 520 even if user 108 has never used it before). In some embodiments, if pickup location 520 is correct, user 108 can proceed without having to provide any input regarding pickup location; otherwise, user can 'tap' the suggested pickup location 520 to cause the list of possible origin locations 904 to be provided.

Referring again to FIG. 10, in addition to displaying the list of possible origin locations 904, process 1000 can involve providing an option to search for an origin location, as indicated at block 1008. For example, search bar 914 can be provided, and user 108 can search for an origin location by inputting information related to the origin location. In some embodiments, user 108 can input the first few characters of a name, address, and/or other information that corresponds with the origin location, and a list of "auto completion" suggestions can be provided based at least in part on the inputted information. User 108 can select one of suggestions to cause address and/or other origin information to be autocompleted. At block 1012, an option to manually input a origin location can be provided. For example, manual input icon 924 can be provided and, upon user 108 selecting manual input icon 924, manual input fields 928 can be provided for enabling user 108 to manually input information corresponding to an origin location. FIGS. 9B and 9C at 928 illustrate that user 108 can manually input name, address, and an apartment, suite, floor number, etc.

At block 1016, process 1000 can involve determining whether user selects an origin location from the list of possible origin locations 904, starts typing a query into search bar 914, or selects the manual input icon 924. At block 1020, if user selects an origin location from list of possible origin locations 904, process 1000 involves auto-completing detailed information that corresponds to the selected origin location. Referring again to block 1016, if user 108 starts typing a query, process 1000 involves providing a list of "auto completion" suggestions as user 108 types the query, as indicated at block 1024. At block 1028, process 1000 can involve determining whether user selects an origin location from the list of "auto completion" suggestions. If so, process 1000 involves autocompleting detailed information that corresponds to the selected origin location, as indicated at block 1020. Otherwise, process 1000 continues providing "auto completion" suggestions as user 108 types the query, as indicated at block 1024. Referring again to block 1016, if user 108 selects the manual input icon 924, process 1000 involves providing manual input fields 928 for inputting origin information, such as recipient name and address, as indicated at block 1032.

At block 1036, user 108 can be provided with an option of adding additional information. FIG. 9 at 932 illustrates that user 108 can input special instructions, such as instructions for handling and/or processing items and/or packages at the packaging and shipping facility and/or shipping company. For example, special instructions, such as "as fast as possible," "fragile," "books," etc., can instruct the packaging and shipping facility on what kind of packaging to use, how to label the package, which postage to apply, whether to expedite packing, etc. Also for example, special instructions, such as "leave at backdoor," "c/o John Doe," "leave at reception," etc., can instruct the packaging and shipping facility to properly label the package, and can instruct the shipping company how handle the package and where to leave the package at the origin location to ensure that the package reaches the correct person, department, or other location or organization at the origin location. At block 1040, user 108 can be prompted to confirm the origin location information. FIG. 9D shows confirmation window 936 that displays the origin location information, and requests user 108 to confirm. For example, user 108 can 'tap' "OK" to confirm, or "Cancel" to further edit the origin location information.

Figure 13:
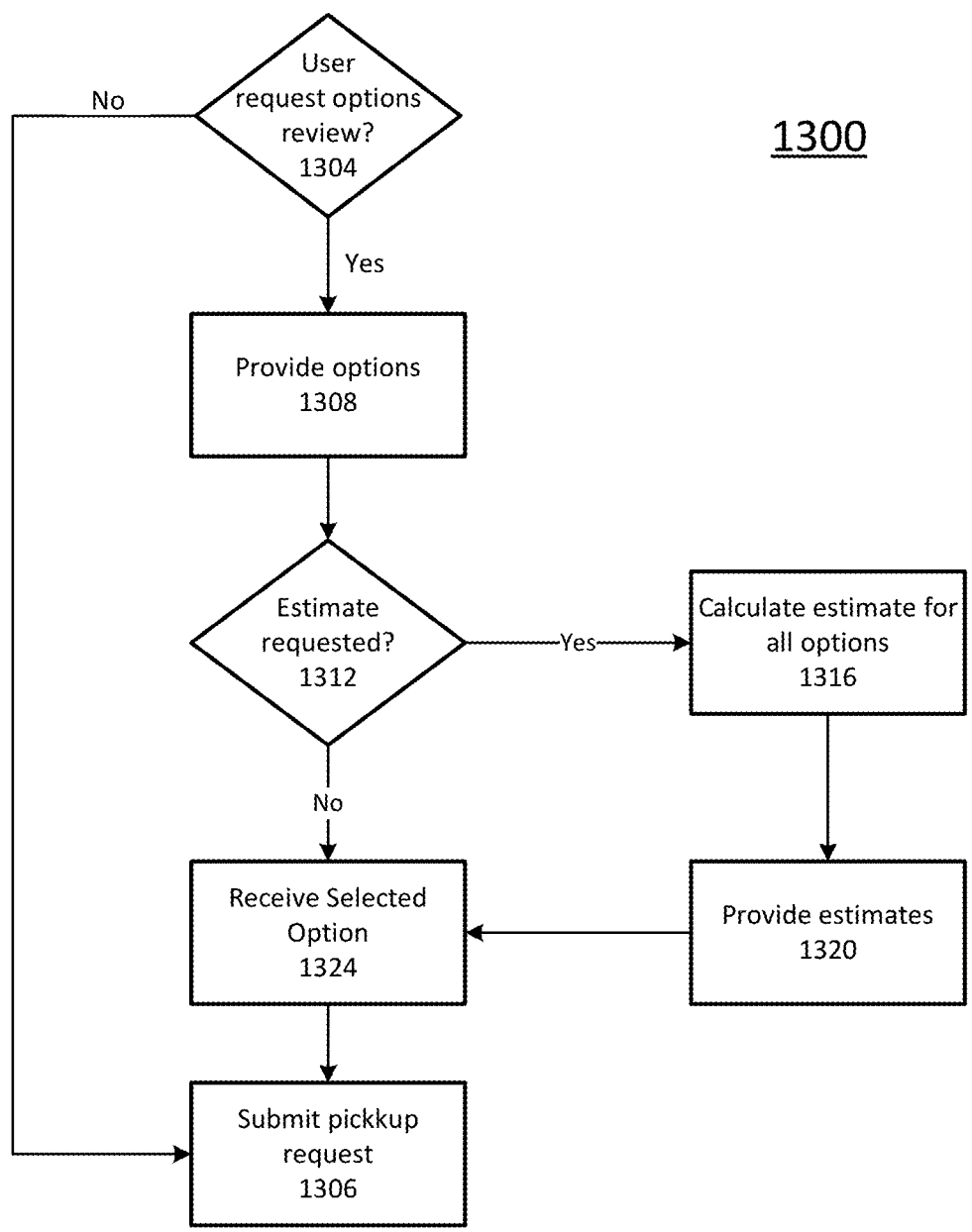
FIG. 13 shows a flow diagram of a process for providing transport options according to some embodiments.

Referring again to FIG. 4, shipping option information can be obtained, as indicated at block 418. In some embodiments, shipping option information can include information related to service level options for shipping the item (e.g., priority, next day, overnight, etc.), insurance for shipping the item, etc. Example embodiments for obtaining shipping options (block 418) are described below with reference to FIGS. 5D, 12A-E, and 13. FIG. 5D shows user interface 514 for enabling user 108 to indicate whether user 108 wants to specify shipping options. FIGS. 12A-E show user interface 1200 for enabling user 108 to input shipping options, according to some embodiments. FIG. 13 shows process 1300 for obtaining shipping options, according to some embodiments. In some embodiments, shipping options module 322 of application services system 312 (FIG. 3) communicates and/or coordinates with on-demand pickup client application 106 of electronic communications device 104 (FIGS. 1 & 3) to implement aspects of process 1300 (FIG. 13) and/or display user interfaces 514 and/or 1204 (FIGS. 5D, 12A-F). In some embodiments, shipping options module 322 and/or on-demand pickup client application 106 can directly and/or indirectly query and/or write to one or more of data stores 354, 358, 362, 366 when implementing aspects of processes 1300. For example, shipping options module 322 and/or on-demand pickup client application 106 can directly and/or indirectly retrieve, update, and/or analyze shipping options information, such as shipping costs and insurance, in one or more of data stores 354, 358, 362, 366. Also for example, shipping options module 322 and/or on-demand pickup client application 106 can directly and/or indirectly retrieve, update, and/or analyze other information, such as information related to the item, user and/or user preferences, pickup/origin location, image data, destination location, and/or other information relevant to picking up and shipping item 120.

FIG. 13 shows that process 1300 generally begins by determining whether user 108 would like to review and/or select shipping options before completing the pickup request, as indicated at block 1304. Process 1300 can involve completing/submitting the pickup request, as indicated at 1306, if user 108 elects not to review and/or select shipping options. For example, FIG. 5D shows that user 108 can select "Pickup Now" icon 528 to complete the pickup request without reviewing and/or selecting shipping options. User involvement in requested pickup can completed when user 108 selects "Pickup Now" icon 528. For example, there's nothing more for user 108 to do, except make item 120 available to be picked up and taken away. FIG. 5D shows that user 108 can select "Shipping Options" icon 524 to request that shipping options be provided for user review. Referring again to block 1304, process 1300 can involve providing shipping options, as indicated at 1308, if user 108 elects to review and/or select shipping options. For example, FIG. 5D shows that user 108 can select "Shipping Options" icon 524 to review and/or select shipping options before completing the pickup request.

At block 1308, process 1300 can involve providing user 108 with shipping options. In some embodiments, shipping options can include service level and costs, and insurance coverage and costs. FIG. 12A at 1202 shows that user 108 can presented with three simple service level options: economy; rush; and rush plus. An estimated delivery dates 1204 and relative price indicators 1206 can be provided to help user 108 compare the service levels and select the appropriate one. For example, "Economy" can has a one-week delivery date, while "Rush" can guarantee a three-day delivery date for three times the cost, and "Rush Plus" can guarantee a next-day delivery for six times the cost. Shipping options provided at block 1308 can also include insurance coverage and rate information. Service level and insurance information can be presented separately or combined, and/or some combination thereof.

At block 1312, process 1300 involves determining whether user 108 requested a shipping cost and/or insurance rate estimate. FIG. 12A at 1202 shows that user 108 can request an estimate by selecting "Get A Shipping Estimate" icon 1208. If an estimate is requested, an estimate can be calculated for each of the presented service level and/or insurance coverage options, as indicated at block 1316. In some embodiments, information about item 120 is obtained to enable calculating shipping option estimates. FIG. 12B shows fields 1210 for inputting item details and/or characteristics, such as height, width, depth, and weight. In some embodiments, in addition to or instead of user inputted item details and/or characteristics, image data related to item 120 can be machine analyzed to estimate such item details and/or characteristics. For example, sensors of electronic communications device 104 can measure and/or determine one or more dimensions, density, volume, and/or other details and/or characteristics of item 120. Some or all of these measurements and/or determinations can be used to calculate the weight of item 120. In some embodiments, this size and weight information for item 120, combined with destination location, enables shipping option estimates to be calculated. In some embodiments, these measurement and/or determination can relate to fragility and value of item 120, and are used to estimate insurance rate information. For example, on-demand pickup client application 106 can transmit some or all of this information to image processing and item transport service 130, and shipping options module 322 can estimate shipping costs and/or insurance rates. In some embodiments, precise estimates can be calculated. Precise estimates may take longer, but they may help attract customers by helping customer find cheaper rates.

In some embodiment, the estimate calculated at 1316 can be the optimal shipping rate. For example, the item is packed and then weighed and measured, and then the optimal shipping rate is selected. In some embodiments, the optimal shipping rate is the cheapest and fastest shipping based the origin and destination addresses, size, weight, fragility, weather conditions, service level, and/or the like. In some embodiments, the estimate calculated at 1316 can be the optimal insurance (i.e., best coverage at the best rate). In some embodiments, the optimal insurance can be determined based on the type of item being shipped, its fragility, weight, size, and value, and the origin and destination location, and/or the like.

At block 1320, process 1300 involves providing the calculated estimates to user 108. For example, FIG. 12C shows "Est. Shipping Cost" 1216 for "Rush Plus", and FIG. 12D shows "Est. Shipping Cost" 1220 for "Economy." At block 1324, process 1300 involves obtaining from user 108 one or more selections for the shipping options. For example, as shown in FIG. 12E, if user 108 selects "Rush," user 108 is provided with a reminder 1224 that the selected option costs about three times the price of economy. In some embodiments, user 108 can select a shipping option at any stage of process 1300. For example, FIG. 12A shows "Upgrade" icon 1212 that enables user 108 to select "Rush." In some embodiments, although user 108 can select "Upgrade" icon 1212 at any time, user 108 can nonetheless be presented with reminder 1224 to help prevent user 108 from accidentally paying more than expected for shipping. At block 1306, process 1300 involves completing/submitting the pick up request. For example, user involvement in the pickup request can be complete, and the only remaining responsibility of user 108 is to make item 120 available for pickup.

Figure 14:
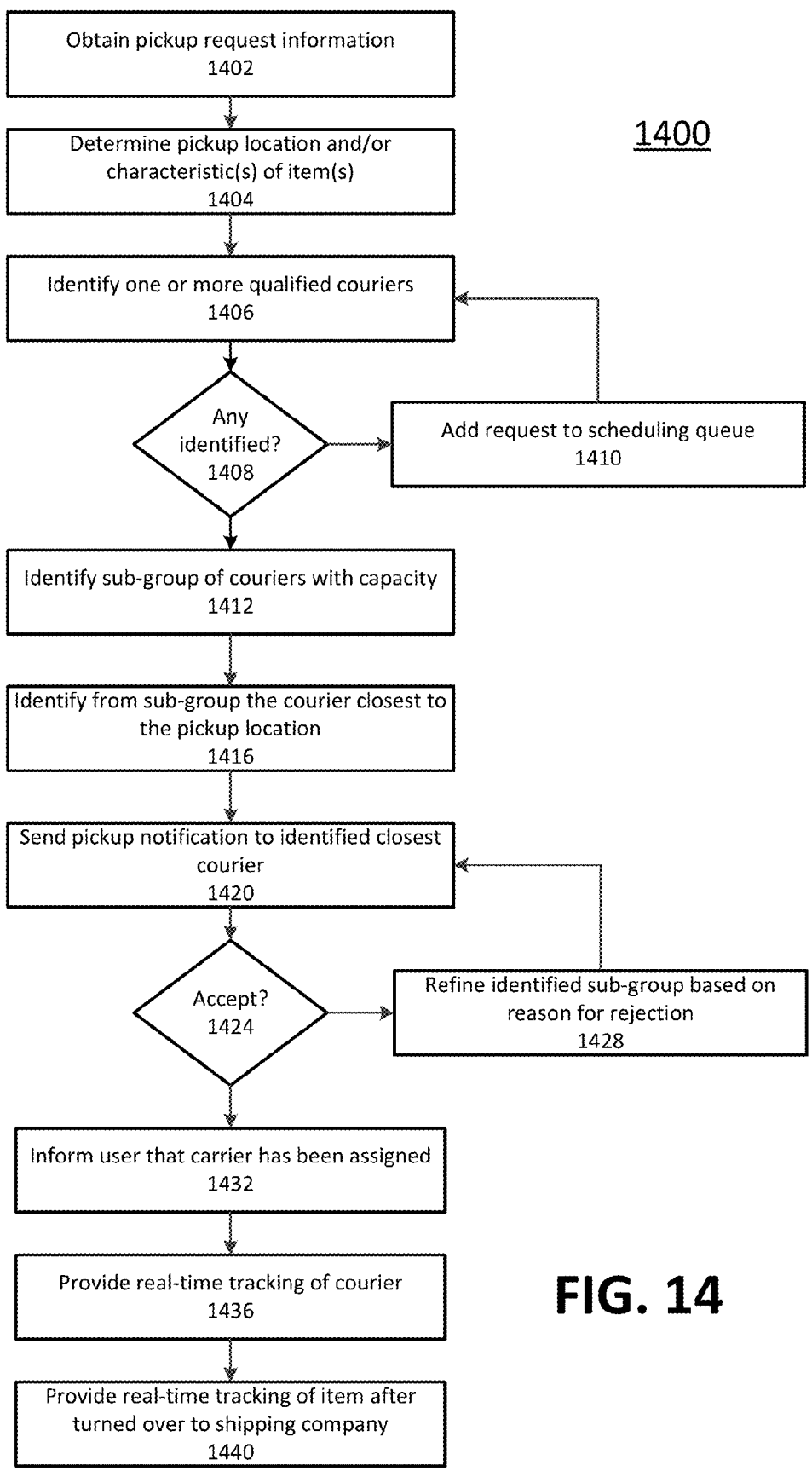
FIG. 14 shows a flow diagram of a process for selecting suitable personnel and/or equipment according to some embodiments.
Figure 15A:
FIGS. 15A-B show graphical user interfaces according to some embodiments.
Figure 15B:

Referring again to FIG. 4, one or more couriers can be selected for dispatch, as indicated at block 422. Example embodiments for selecting a courier (block 422) are described below with reference to FIGS. 14 and 15A-B. FIG. 14 shows process 1400 for selecting one or more couriers to be dispatched, according to some embodiments. FIGS. 15A-B show user interface 1500 for real-time or near real-time courier tracking, according to some embodiments. In some embodiments, shipping options module 322 of application services system 312 (FIG. 3) communicates and/or coordinates with on-demand pickup client application 106 of electronic communications device 104 (FIGS. 1 & 3) to implement aspects of process 1300 (FIG. 13) and/or display user interface 1500 (FIGS. 15A-B). In some embodiments, courier selection module 326 and/or on-demand pickup client application 106 can directly and/or indirectly query and/or write to one or more of data stores 354, 358, 362, 366 when implementing aspects of processes 1400. For example, courier selection module 326 and/or on-demand pickup client application 106 can directly and/or indirectly retrieve, update, and/or analyze information related to courier selection, such as courier and user information, in one or more of data stores 354, 358, 362, 366. Also for example, courier selection module 326 and/or on-demand pickup client application 106 can directly and/or indirectly retrieve, update, and/or analyze other information, such as information related to details and/or characteristics of the item, user and/or user preferences, pickup/origin locations, image data, and/or other information relevant to picking up and shipping item 120.

In some embodiments, process 1400 of FIG. 14 is implemented in a reverse hub-and-spoke system, where couriers are spokes that pickup and transport items from pickup locations to the nearest mobile hub (e.g., van), rather than driving or biking all the way to a central depot. When one of the mobile hubs fills up, it transports the items to the central depot, and another mobile hub takes its place. Separate hub-and-spoke systems can be deployed to various neighborhoods for picking up items in those respective neighborhoods, and each mobile hub tries to stay near the middle of the couriers in its respective neighborhood. This system is referred to as a "reverse" hub-and-spoke system because the spokes (e.g., couriers) are transporting items to the hubs, rather than from the hubs.

FIG. 14 shows that process 1400 generally begins with obtaining pickup request information, as indicated at block 1402. In some embodiments, pickup request information includes information related to the pickup/origin location, item details and/or characteristics, an image of item 120, destination location, shipping options (e.g., service level, insurance coverage), and/or the like. As indicated at block 1404, process 1400 can involve analyzing the pickup request information to determine a pickup location (e.g., current location of user 108) and/or one or more characteristics of item 120. In some embodiments, the analysis indicated at block 1404 can involve analyzing image data related to item 120, and/or analyzing results of previous image analysis. Such analysis can be used to determine one or more characteristics of item 120. For example, as noted, image data can be analyzed to determine one or more dimensions, density, volume, weight, fragility, and/or other characteristics of item 120. In some embodiments, analyzing image data related item 120 can involve comparing the image data with stored image data to identify similar items previously shipped by user 108 and/or other users. Stored characteristics of these similar items can be considered when determining characteristics of item 120. For example, the stored dimensions, density, volume, weight, fragility, etc. of these similar items can be used to estimate the corresponding characteristics of item 120. In some embodiments, user information of user 108 can be used to identify other users who may ship similar items. For example, other users who engage in similar businesses and/or who deal with similar items (e.g., types, categories) can be identified, and the image data of item 120 can be compared with image data of previous items shipped by those users. If similar items are identified, then stored information related to the characteristics of those items can be considered when determining corresponding characteristics of item 120. Also for example, known techniques for identifying objects in images can be applied to the image data related to item 120 to make assumptions about one or more characteristics of item 120.

In some embodiments, analysis indicated at block 1404 can involve analyzing other information (e.g., non-image data) to determine one or more characteristics of item 120. Such other information can include user-inputted height, width, depth, weight, and/or other characteristics of item 120 (see, e.g., FIG. 12B). Such information can also include information related to fragility of item 120, and/or whether item 120 is or includes hazardous material and/or requires some type of special handling. In some embodiments, some or all of the analysis indicated at block 1404 can be machine analysis. In some embodiments, components of applications services system 308 of image processing and item transport service 130 can perform some or all of the analysis indicated at block 1404. For example, image processing module 314 can analyze image data related to item 120 and/or search one or more data stores 324 for images of similar items. In some embodiments, some or all of the analysis indicated at block 1404 can human review. For example, humans may review images and/or other information related to item 120 to determine one or more characteristics of item 120. In some embodiments, a hybrid approach may be applied to accomplish some or all of the analysis indicated at block 1404. For example, machine analysis can be used for first-level review. If that analysis fails yield reliable information related to one or more characteristics of item 120, the image and/or other information can be routed to a human for review. The human can determine/guess one or more characteristics of item 120 based on the image and/or other information.

In some embodiments, analysis indicated at block 1404 can involve determining a pickup location. As noted, the pickup location, in some embodiments, can be the current location of user 108, and can be determined based on location information obtained from electronic communication device 104.

At block 1406, process 1400 can involve identifying one or more couriers who are qualified and/or best suited to pickup and transport item 120. For example, the identified couriers may be couriers who can arrive at the pickup location (e.g., current location of user 108) within a predetermined time period after user 108 submits an on-demand pickup request to pickup item 120. Also for example, for large and heavy items the identified couriers may be limited to couriers who drive trucks or vans. Similarly, for items that are just documents, the qualified couriers may include only bike messengers because they are best suited to pickup and handle documents in an efficient and environmentally friendly way. Also for example, hazardous items and those requiring special handling can be matched with couriers who have the requisite certifications, qualifications, and/or equipment. In some embodiments, couriers who are qualified to handle item 120 may nonetheless be disqualified if user 108 previously gave them a bad, or even neutral, review.

At block 1408, process 1400 can involve determining whether any qualified couriers were identified. At block 1410, if no qualified couriers were identified, process 1400 can involve adding the pickup request to a queue, and continue attempting to identify a qualified courier, as indicated at block 1406. It should be appreciated that user 108 can be notified that the request has been queued, and can be notified when a qualified courier is identified. It should be appreciated that the request can be added to a queue at any step of process 1400, such as when a qualified courier is identified but does not have capacity or denies the pickup request.

At block 1412, if one or more qualified couriers were identified, process 1400 can involve identifying a sub-group of couriers who have capacity to pickup and transport item 120. In some embodiments, the capacity of the individual couriers in the identified group can be determined, and those with inadequate capacity can be eliminated, and the resulting group is sometimes referred to herein as the "sub-group." In some embodiments, capacity can be determined by reviewing a courier's recent and/or scheduled pickups and drop-offs to determine the aggregate volume and weight of the items that the courier will have "on board" when he or she picks up item 120.

At block 1416, process 1400 can involve identifying from the sub-group of couriers the courier closest to the pickup location of item 120. In some embodiments, location information for each of the couriers is obtained and compared to the pickup location, and the courier whose location is closest to the pickup location is selected. For example, courier selection module 226 can obtain such location information from courier information data store 358. In some embodiments, courier location is available because the couriers carry electronic devices that are the same as or similar to electronic communications device 104 and that include location components that are the same or similar to location component 212. Couriers' electronic devices may also include on-demand pickup client application 106, or a similar version, which can output location information, either periodically or upon request.

At block 1420, process 1400 can involve transmitting a pickup notification to the identified courier. In some embodiments, pickup notification can include one or more images of item 120, one or more characteristics of item 120 (e.g., dimensions, weight, fragility, etc.), the pickup location, the service level (overnight, priority, etc.), and/or other information. The courier can review the information included in the pickup notification, and decide whether to accept or decline. At decision block 1424, process 1400 involves determining whether the courier accepted the pickup request. If the courier declined, at block 1428, process 1400 involves reviewing the courier's reason for declining (if a reason was given) and, if the reason would also apply to other couriers in the sub-group, refine the sub-group in light of the reason. For example, the reason could be that image processing software that reviewed the image assigned the wrong characteristics to the item, and the courier declined after reviewing the image and determining that item 120 is actually be much bigger than indicated in the pickup notification. In this example, other couriers who review the image may decline for the same reason. Thus, couriers whose capacity is similar declining carrier are removed from the sub-group, and new couriers with more capacity can be added. After the sub-group has been refined to at least exclude the declining courier, process 1400 can involve sending the pickup request to the next closest courier in the sub-group, as indicated by block 1220. If that courier accepts, user 108 can informed that the courier has been assigned to pick up item 120, as indicated at block 1432. As indicated at block 1436, user 108 can be provided with real-time or near real-time tracking of the courier's position. FIG. 15A shows interface 1504 for real-time or near real-time tracking of the courier's position. As illustrated, icon 1508 represents the location of the courier and icon 1512 represents the location of the pickup location. Accordingly, user 108 can see the courier's location, and watch the courier's progress toward the pickup location. This allows the user to determine whether he or she has time to run an errand, take a shower, do some work in the basement, etc. before the courier arrives to pick up the item 120.

At block 1440, process 1400 can involve providing real-time or near real-time tracking of item 120 when in the hands of the shipping company. This information is available until the item is delivered at the ultimate destination.

FIG. 15B shows interface 1516 for real-time or near real-time tracking of item 120 when in the hands of the shipping company. Interface 1516 can include an image 1520 of item 120, and a time line 1524 that tracks the progress of item 120 until it reaches the destination location. This information can be available to both the user who is shipping the item and the user who is receiving the time. In such cases, the both the sender and the recipient can see the location of item 120 while in the hands of the shipping company, and watch the progress toward the ultimate destination. Image 1520 can be the actual photograph taken by user 108 when user 108 submitted the pickup request. In such cases, image 1520 is the actual photo of the item being shipped. This is advantageous over just a tracking code or a photo from a catalogue because both parties to the transaction know exactly what inside the box before delivery is complete.

In some embodiments, a system can be provided that includes an image processing and item transport service. In some embodiments, the image processing and item transport service can be configured to: obtain from a location-aware, network-connected handheld user device, via a communications network, a digital image of an item; analyze the digital image of item to determine a physical characteristic of the item, the physical characteristic including a weight and/or a dimension; query a data store to identify a courier that is qualified to pick up the item, the courier being identified based at least in part on a comparison of a capacity and/or capability of the courier and the physical characteristic of the item; and transmit to the courier, via the communications network, a dispatch notification that includes the digital image of the item.

In some embodiments, the location-aware, network-connected handheld user device can include an image-capture component for capturing the digital image of item; a location component for determining location information that corresponds to a location of a user; a communications component for facilitating data communications over the communications network; a user-input component for receiving user input; a user-output component for providing visual output; memory for storing executable instructions; and a processor being provided in communication with the image-capture component, the location component, the communications component, the user-input component, the user-output component, and the memory.

In some embodiments, the system can further include an on-demand shipping client application that is stored in the memory of the handheld user device. In some embodiments, the on-demand shipping client application, when executed by the processor of the handheld user device, can be configured to output, via the user-output component of the handheld user device, at least one graphical user interface that enables the user to provide, via the user-input component, user input that causes the image-capture component of the handheld user device to capture a digital image of the item, and that corresponds to a shipping destination for the item. In some embodiments, the on-demand shipping client application, when executed by the processor of the handheld user device, is configured to query the location component of the handheld user device for location information that corresponds to the current location of the user; and transmit to the communications network, via the communications component of the handheld user device, the digital image of the item, the user input that corresponds to the shipping destination, and the location information that corresponds to the current location of the user.

In some embodiments, upon being launched, the on-demand shipping client application can display, via the user-output component, an add shipment graphical user interface that enables the user to select, via the user-input component, an add shipment icon to begin inputting shipping information for the item to be shipped. In some embodiments, the on-demand shipping client application can display, via the user-output component, a ship-to graphical user interface that enables the user to input, via the user-input component, an estimated weight of the item to be shipped.

In some embodiments, the image processing and item transport service can obtain, via the communications network, the location information that corresponds to the current location of the user. The courier can be identified based at least in part on a comparison of the current location of the user and the real-time or near real-time courier location information of the courier.

In some embodiments, the image processing and item transport system can be configured to maintain shipping information for a plurality of previous shipments, the shipping information including information that indicates at least a shipping company that shipped the previous shipments, the shipping information further including package weight, a package dimension, an origin location, a shipping destination, a transit time, a service level, and/or shipping price for some or all of the previous shipments. In some embodiments, the image processing and item transport system is also configured to maintain user information for a plurality of users, the user information including user identification information for enabling the image processing and on-demand pickup dispatching service to exchange electronic communications with the handheld user device of the user, the user information further including payment information for enabling the image processing and on-demand pickup dispatching service to collect payment from a payment account the user. In some embodiments, the image processing and item transport system is further configured to maintain courier information for a plurality of couriers, the courier information including courier identification information for enabling the image processing and on-demand pickup dispatching service to exchange electronic communications, via the communications network, with an electronic device of the courier.

In some embodiments, the image processing and item transport system can be configured to estimate a shipping cost and a transit time for shipping the item to the shipping destination, the shipping costing and the transit time being estimated based at least in part on the physical characteristic of the item and the shipping destination. In some embodiments, the image processing and item transport system is further configured to communicate to the user, via the communications network and the on-demand shipping client application, the estimated shipping cost and transit time for shipping the item to be shipped to the shipping destination. In some embodiments, the image processing and item transport system is further configured to, responsive to obtaining from the user a user response that approves the estimated shipping cost and transit time, select the courier from the plurality of couriers based at least in part on the current location of the user and the physical characteristic of the item to be shipped.

In some embodiments, the image processing and item transport system can be configured to receive from the courier, via the communications network, a courier response that indicates whether the courier accepts or declines the pickup notification. In some embodiments, the courier can decide whether to accept or decline based at least in part on the physical characteristic determined from the review of the digital image of the item to be shipped.

In some embodiments, the image processing and item transport system can be configured to analyze the digital image of the item to be shipped to automatically detect determine identifying information, where the pickup-notification message can include the identifying information. In some embodiments, the image processing and item transport system analyzes the digital image to determine the identifying information by comparing the digital image of the item to be shipped to stored digital images of previously shipped items to identify similar digital image. In some embodiments, the identifying information describes a physical characteristic of the item to be shipped and/or or a category of items to which the item to be shipped belongs.

Figure 16:
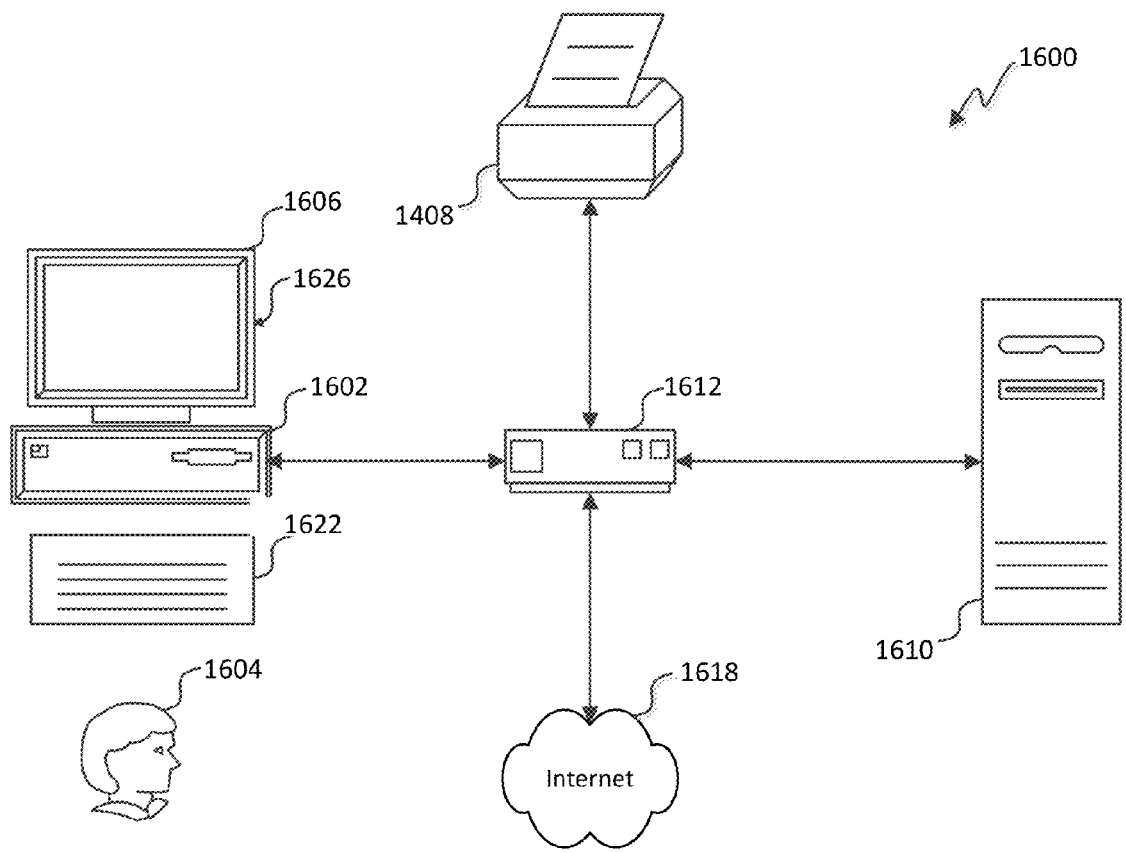
FIG. 16 shows a block diagram of an environment for implementing aspects of the present disclosure according to some embodiments.

FIG. 16 is an example environment 1600 in which embodiments may be implemented. The environment 1600 includes a computer 1626, a network router 1612, a printer 1608, and a server 1610, interconnected by a network 1618, such as the Internet, wide area network, local area network, etc. The computer 1626 includes a monitor 1606, a processor 1602, and keyboard 1622. The computer 1626 can be, for example, a laptop computer, desktop computer, handheld computer, and electronic device, such as electronic communications device 104, a mainframe computer, etc. According to embodiments, users can input commands into the computer 1626 using various input devices, such as a touch screen, a mouse, the keyboard 1622, track ball, etc.

The server 1610 may, for example, be used to store additional software programs and data. In one embodiment, software implementing the systems, methods, and processes described herein can be stored on a storage medium in the server 1610. Thus, the software can be run from the storage medium in the server 1610. In another embodiment, software implementing the systems, methods, and processes described herein can be stored on a storage medium in the computer 1626. Thus, the software can be run from the storage medium in the computer system 1626. Therefore, in this embodiment, the software can be used whether or not computer 1626 is connected to network router 1612. It should be appreciated that the printer 1608 may be connected directly to computer 1626, rather than via the router 1612.

Figure 17:
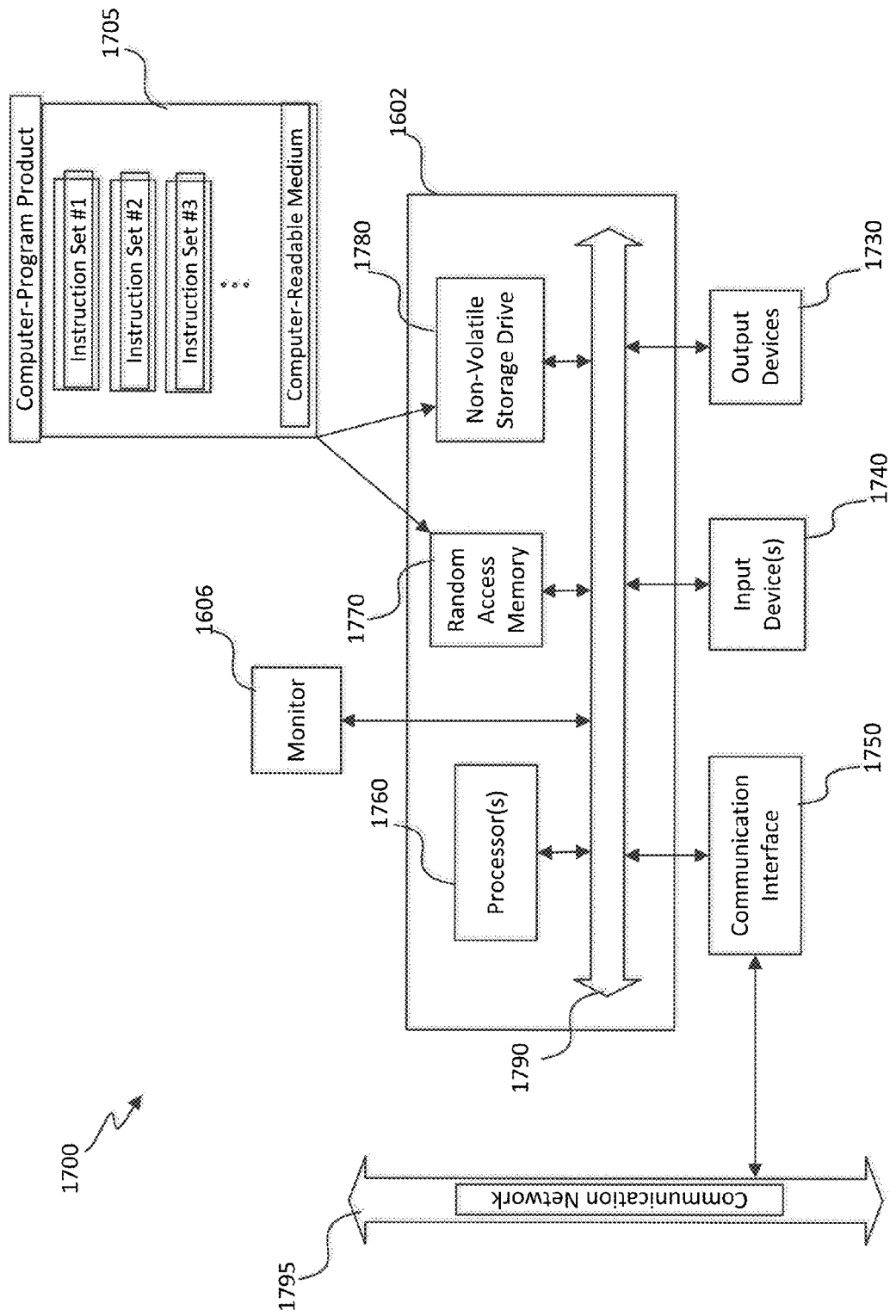
FIG. 17 shows a block diagram of an environment for implementing aspects of the present disclosure according to some embodiments.

As illustrated in FIG. 17, an embodiment of a special-purpose computer system 1700 is shown. For example, the on-demand shipping manager 154 and components thereof may be a special-purpose computer system 1700. The above methods may be implemented by computer-program products that direct a computer system to perform the actions of the above-described processes and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer 1626, it is transformed into the special-purpose computer system 1700.

Special-purpose computer system 1700 comprises a computer 1702 having connected thereto user output device(s) 1706 (e.g., monitor), user input device(s) 1710 (e.g., keyboard, mouse, track ball, touch screen), communication interface 1716, and/or a computer-program product 1720 stored in a tangible computer-readable memory. The computer-program product 1720 directs computer system 1700 to perform the above-described methods and processes. The computer 1702 may include one or more processors 1726 that communicate with a number of peripheral devices via a bus subsystem 1730. These peripheral devices may include the user output device(s) 1706, the user input device(s) 1710, the communications interface 1716, and a storage subsystem, such as random access memory (RAM) 1736 and non-volatile storage drive 1740 (e.g., disk drive, optical drive, solid state drive), which are forms of tangible computer-readable memory.

The computer-program product 1720 may be stored in the non-volatile storage drive 1740 or another computer-readable medium accessible to the computer 1702 and loaded into memory 1736. Each processor 1726 may comprise a microprocessor, such as a microprocessor from Intel® or Advanced Micro Devices, Inc.®, or the like. To support computer-program product 1705, the computer 1702 runs an operating system that handles the communications of product 1720 with the above-noted components, as well as the communications between the above-noted components in support of the computer-program product 1720. Example operating systems include Windows® or the like from Microsoft Corporation, OS X® from Apple, Solaris® from Sun Microsystems, LINUX, UNIX, and the like.

User input devices 1710 include all possible types of devices and mechanisms to input information to the computer 1702. These may include a keyboard, a keypad, a mouse, a scanner, a digital drawing pad, a touch screen incorporated into the display, audio input devices such as voice recognition systems, microphones. The user input devices 1710 typically allow a user to select objects, icons, text and the like that appear on a monitor via a command such as a click of a button or the like. The user output devices 1730 include all possible types of devices and mechanisms to output information from computer 1602. These may include a display, a monitor, printers, non-visual displays such as audio output devices, etc.

The communications interface 1716 provides an interface to other communication networks and devices and may serve as an interface to receive data from and transmit data to other systems, wide area networks (WANs) and/or the Internet. Embodiments of communications interface 1716 include an Ethernet card, a modem (telephone, satellite, cable, ISDN), a (asynchronous) digital subscriber line (DSL) unit, a FireWire® interface, a USB®, interface, a wireless network adapter, and the like. For example, communications interface 1716 may be coupled to a computer network, to a FireWire® bus, or the like. In other embodiments, the communications interface 1716 may be physically integrated on a motherboard of the computer 1702, and/or may be a software program, or the like.

The memory 1736 and non-volatile storage drive 1740 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, barcodes, semiconductor memories such as flash memories, read-only-memories (ROMs), battery-backed volatile memories, networked storage devices, and the like. The memory 1736 and the non-volatile storage drive 1740 may be configured to store the basic programming and data constructs that provide the functionality of various embodiments of the present invention, as described above.

Software instruction sets that provide the functionality of the present invention may be stored in the memory 1736 and non-volatile storage drive 1740. These instruction sets or code may be executed by the processor(s) 1726. The memory 1736 and the non-volatile storage drive 1740 may also provide a repository to store data and data structures used in accordance with the present invention. The memory 1736 and the non-volatile storage drive 1740 may include a number of memories including a main RAM to store of instructions and data during program execution and a ROM in which fixed instructions are stored. The memory 1736 and the non-volatile storage drive 1740 may include a file storage subsystem providing persistent (non-volatile) storage of program and/or data files. The memory 1736 and the non-volatile storage drive 1740 may also include removable storage systems, such as removable flash memory.

The bus subsystem 1730 provides a mechanism to allow the various components and subsystems of computer 1702 to communicate with each other as intended. Although bus subsystem 1730 is shown schematically as a single bus, alternative embodiments of the bus subsystem may utilize multiple busses or communication paths within the computer 1702.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including ROM, RAM, magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

What is claimed is:

1. A system, comprising:
    an image processing and on-demand pickup dispatching service being capable of data communications over a communications network, the image processing and on-demand pickup dispatching service being configured to:
        maintain shipping information for a plurality of previous shipments, the shipping information including information that indicates at least a shipping company that shipped the previous shipments, the shipping information further including package weight, a package dimensional size, an origin location, a shipping destination, a transit time, a service level, and/or shipping price for some or all of the previous shipments;
        maintain user information for a plurality of users, the user information including user identification information for enabling the image processing and on-demand pickup dispatching service to exchange electronic communications with users, the user information further including payment information for enabling the image processing and on-demand pickup dispatching service to collect payment from users; and maintain courier information for a plurality of couriers, the courier information including courier identification information for enabling the image processing and on-demand pickup dispatching service to exchange electronic communications with couriers, the courier information further including courier capacity and location information; and a location-aware, network-connected handheld user device, including:
 an image-capture component for capturing a digital image of an item to be shipped;
 a location component for determining location information that corresponds to a location of a user;
 a communications component for facilitating data communications over the communications network;
 a user-input component for receiving user input;
 a user-output component for providing visual output;
 memory for storing executable instructions; and
 a processor being provided in communication with the image-capture component, the location component, the communications component, the user-input component, the user-output component, and the memory; and an on-demand shipping client application being stored in the memory of the handheld user device, wherein the on-demand shipping client application, when executed by the processor of the handheld user device, is configured to:
 output, via the user-output component of the handheld user device, at least one graphical user interface that enables the user to provide, via the user-input component, user input that:
  causes the image-capture component of the handheld user device to capture a digital image of the item to be shipped, the digital image being captured prior to packaging of the item; and
  corresponds to a shipping destination for the item to be shipped;
 query the location component of the handheld user device for location information that corresponds to the current location of the user; and
 output, via the communications component of the handheld user device, the digital image of the item to be shipped, the user input that corresponds to the shipping destination, and the location information that corresponds to the current location of the user;

the image processing and on-demand pickup dispatching service being configured to:
 obtain from the handheld user device, via the communications network, the digital image of the item to be shipped and the location information that corresponds to the current location of the user;
 use a digital image processing component to process the digital image to determine a physical characteristic of the item to be shipped, the physical characteristic including a weight and/or a dimensional size;
 query the courier capacity and location information to identify a courier from the plurality of couriers, wherein the courier is identified based at least in part on a capacity to handle the physical characteristic of the item to be shipped and the current location of the user;
 transmit to the courier, via the communications network, a dispatch notification that includes the digital image of the item to be shipped, information that indicates the physical characteristic of the item to be shipped, and information that indicates the current location of the user; and
 receive from the courier, via the communications network, a courier response that indicates whether the courier accepts or declines the dispatch notification, wherein the courier response is based at least in part on an evaluation of (i) the item to be shipped as represented in the digital image that was captured prior to packaging and (ii) the information that was determined using the digital image processing component and that indicates the physical characteristic of the item to be shipped, wherein the evaluation of the item as represented in the digital image enables the courier to at least partially verify (a) the information that was determined using the digital image processing component and/or (b) that the item does not include an irregular dimension for which the courier would not have capacity to handle.

2. The system of claim 1, wherein the image processing and on-demand pickup dispatching service is further configured to:
 use the image processing component to process the digital image to determine whether multiple items are represented in the digital image.

3. The system of claim 2, wherein, if multiple items are represented in the digital image, processing the digital image to determine the physical characteristic involves determining the dimensional size and/or weight of each of the multiple items represented in the digital image.

4. The system of claim 3, wherein the image processing and on-demand pickup dispatching service is further configured to:
 process the dimensional size and/or weight of each of the multiple items represented in the digital image to determine whether the multiple items can be packed together for transport.

5. The system of claim 1, wherein the image processing and on-demand pickup dispatching service is further configured to:
 use the image processing component to process the digital image to detect identifying information about the item represented in the digital image;
 wherein processing the digital image to detect identifying information about the item represented in the digital image involves comparing the digital representation of the item represented in the digital image to stored digital representations of previously shipped items;
 wherein the identifying information describes a physical characteristic of the item represented in the digital image and/or or a category of items to which the item represented in the digital image belongs.

* * * * *